United States Patent
Nishikawa

(10) Patent No.: US 7,356,103 B2
(45) Date of Patent: Apr. 8, 2008

(54) SIGNAL PROCESSING CIRCUIT AND QUADRATURE DEMODULATION APPARATUS AND METHOD OF ESTIMATING ERROR THEREOF

(75) Inventor: Takurou Nishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 655 days.

(21) Appl. No.: 10/854,583

(22) Filed: May 26, 2004

(65) Prior Publication Data

US 2005/0147190 A1     Jul. 7, 2005

(30) Foreign Application Priority Data

Jan. 6, 2004    (JP)    ................... 2004-001401

(51) Int. Cl.
*H04L 27/08* (2006.01)

(52) U.S. Cl. .................................. 375/345

(58) Field of Classification Search ............... 375/343, 375/345, 285, 322, 326, 260; 455/384, 296
See application file for complete search history.

(56) References Cited

U.S. PATENT DOCUMENTS

| | | | | |
|---|---|---|---|---|
| 5,148,451 A | * | 9/1992 | Otani et al. ................. | 375/344 |
| 5,726,973 A | * | 3/1998 | Isaksson ..................... | 370/203 |
| 6,208,698 B1 | * | 3/2001 | Marchesani et al. ........ | 375/298 |
| 6,377,620 B1 | * | 4/2002 | Ozluturk et al. ............ | 375/235 |
| 7,177,372 B2 | * | 2/2007 | Gu .............................. | 375/316 |
| 7,227,912 B2 | * | 6/2007 | Kasperkovitz ............... | 375/322 |
| 2003/0231726 A1 | * | 12/2003 | Schuchert et al. .......... | 375/350 |

FOREIGN PATENT DOCUMENTS

| | | |
|---|---|---|
| JP | 11-252188 | 9/1999 |
| JP | 2003-8674 | 1/2003 |

* cited by examiner

*Primary Examiner*—Khanh C. Tran
(74) *Attorney, Agent, or Firm*—Katten Muchin Rosenman LLP

(57) ABSTRACT

To provide a signal processing circuit which makes it possible to accurately estimate not only amplitude error but also phase error of a signal caused by device characteristics of components of a receiver, correct swiftly the error component without providing feedback control, and eliminate signal deterioration. This signal processing circuit is arranged to have a cross-correlation value calculating unit for calculating a cross-correlation value of a pair of signals having undergone a quadrature detection and a phase error calculating unit for calculating a phase displacement of one of the pair of signals with respect to the other of the same as a phase error based on the cross-correlation value calculated by the cross-correlation value calculating unit.

18 Claims, 11 Drawing Sheets

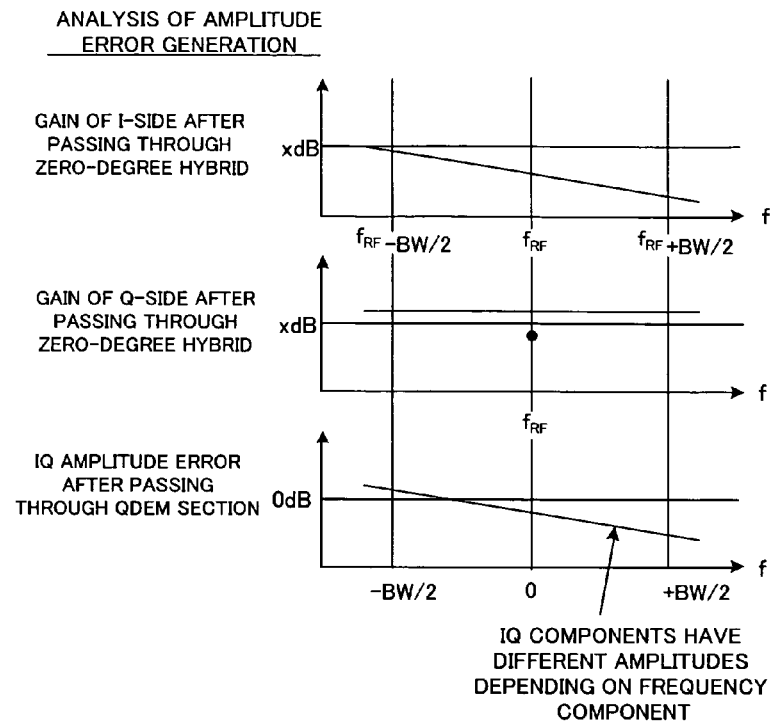
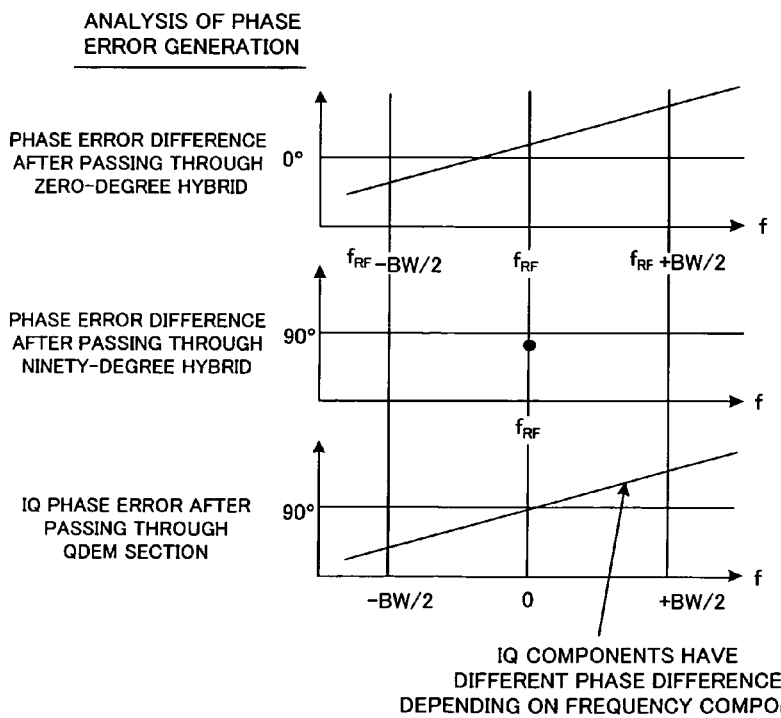

SIGNAL PROCESSING CIRCUIT AND QUADRATURE DEMODULATION APPARATUS AND METHOD OF ESTIMATING ERROR THEREOF

BACKGROUND OF THE INVENTION

1) Field of the Invention

The present invention relates to a signal processing circuit for carrying out signal processing on an I (In-Phase) signal and a Q (Quadrature) signal having undergone quadrature detection and a quadrature demodulation apparatus and a method of estimating the error thereof which are suitable for use in a receiver of a communication system, or more preferably in a receiver of a radio wave communication system.

2) Description of the Related Art

FIG. 8 is a block diagram showing a general arrangement of a receiver 100. As shown in FIG. 8, the receiver 100 has an antenna 101 and a radio wave signal sent from a transmitter not shown can be received by the antenna 101. The signal received by the antenna 101 is placed under control of an AGC (Automatic Gain Control) amplifier 102 so that the signal has a constant gain. This signal is supplied to a band-pass filter 103 in which unnecessary wave components are removed and then subjected to a quadrature demodulation in a quadrature demodulation unit 104. In this way the signal is converted into a baseband signal.

The quadrature demodulation unit 104 is arranged to include a zero-degree hybrid (0 deg. HYB) 104a for dividing a radio wave frequency signal fRF passing through the band-pass filter 103 into a couple of signal flows, a local oscillator 104b for generating a local signal having a frequency equal to that of the received demodulated signal, a ninety-degree hybrid (90 deg. HYB) 104c for producing from the aforesaid local signal from the local oscillator 104b a couple of local signals having a phase shifted by 90 deg. with respect to each other, and outputting them to two mixers 104i and 104q.

That is, the two mixers 104i and 104q multiply the couple of radio wave frequency signal deriving from the branching by the aforesaid zero-degree hybrid 104a with a couple of local signals generated from the ninety-degree hybrid 104c, respectively. Thus, an I-signal and a Q-signal, i.e., a pair of baseband signals having a quadrature property relative to each other, can be generated from the mixers 104i and 104q, respectively.

Subsequently, in the receiver 100 shown in FIG. 8, the I-signal and the Q-signal (hereinafter sometimes referred to as I/Q signals) generated from the quadrature demodulation unit 104 are supplied to low-pass filters 105i and 105q in which high frequency components are removed therefrom, respectively. Then, the signals are supplied to A/D (analog-to-digital) converters 106i and 106q in which the signals are converted into digital signals, respectively. Thereafter, the digital signals supplied from the A/D converters 106i and 106q are supplied to a digital demodulation processing unit 107 in which data demodulation is carried out.

Meanwhile, it is known that the digital signals supplied to the digital demodulation processing unit 107 suffer from amplitude error or phase error caused by inherent characteristics of devices constituting the quadrature demodulation unit 104 or characteristics of the low-pass filters 105i and 105q and the A/D converters 106i and 106q.

For example, one of device components arranged as the zero-degree hybrid 104a cannot always have a property of uniform signal component distribution to the baseband of the I-signal side and the Q-signal side, due to the inherent device characteristic. For this reason, amplitude error tends to occur between the I-signal and the Q-signal.

In more concretely, as shown in FIG. 11b, the Q-signal distributed by the zero-degree hybrid 104a can have a uniform gain in a signal band BW. However, as for the I-signal distributed in the similar manner as shown in FIG. 11a, the I-signal tends to have a gain lowered in a relatively high frequency band zone as compared with a relatively low frequency band zone. As a consequence, the amplitude error (i.e., the gain difference) of the I/Q signals will be placed under influence of the amplitude error of the I-side signal. Thus, as shown in FIG. 11c, the high frequency band zone has an amplitude value lowered as compared with the low frequency band zone.

Furthermore, one of device components arranged as the zero-degree hybrid 104a and the ninety-degree hybrid 104c cannot always have a property of uniform distribution of a signal having an ideal angle relative to the input, due to the inherent device characteristic. For this reason, phase error tends to occur between the I-signal and the Q-signal.

In more concretely, as shown in FIG. 12a, the zero-degree hybrid 104a tends to distribute the radio wave frequency signal which is shifted relative to the ideal zero-degree. Therefore, for example, the high frequency component tends to have error proceeding relative to the zero-phase in the radio frequency signal band, and the low frequency component tends to have error delaying relative to the zero-phase. Furthermore, as shown in FIG. 12b, also the ninety-degree hybrid 104c tends to generate a couple of local signals shifted from the ideal 90 degrees. For this reason, as shown in FIG. 12c, the phase error between the I-signal and the Q-signal which serve as outputs of the quadrature demodulation unit 104 will become one deriving from summation of phase errors of the zero-degree hybrid 104a and the ninety-degree hybrid 104c at the mixers 104i and 104q.

The above-described quadrature demodulation unit 104 will generate the I-signal and the Q-signal which are left having the summation of the aforesaid amplitude errors and the phase errors.

Furthermore, the quadrature demodulation unit 104 has separated channels for the I/Q signals in the later stage thereof and each of the channels has a series of components (see reference numerals 105i, 106i, 105q, 106q). These components have variation in gain and this variation causes an electric power value difference in the I/Q signals and this electric power value difference will also cause amplitude error.

If the received signal component containing the above-described received amplitude error and the phase error (such kind of errors will sometimes take amplitude-phase error as a generic name) is subjected to data demodulation processing in the digital demodulation processing unit 107, then difficulty will be brought about in improvement of the BER (bit error rate) characteristic.

If the receiver 100 is requested to handle a signal having a relatively low S/N ratio (signal-to-noise ratio), only small influence will be caused from the amplitude error and the phase error. However, if the receiver 100 is requested to handle a signal in a manner of spread spectrum coding or to transmit a signal having a format necessitating a high S/N ratio such as of multilevel coding signal, the amplitude-phase error components will look like a noise, with the result that relatively large influence will be caused on the BER ratio.

Accordingly, in order to achieve improvement in the receiver at the characteristic of the data demodulation processing in the digital demodulation processing unit 107, it is requested to eliminate the above-described amplitude-phase error component. As a technology for solving a problem of the above-described amplitude error or the phase error, there can be introduced known technology disclosed in the following Patent document 1 and Patent document 2.

According to the technology disclosed in Patent document 1, as for a signal having undergone digital demodulation processing in a demodulation circuit, a received signal quality is detected from a signal before error correction processing and a signal having undergone error correction processing for internal code and external code. Thereafter, in order for correcting the amplitude error and the phase error of the I/Q signals, feedback control is effected on the amount of shift of a ninety-degree shifter and the characteristic of a low-pass filter.

Further, Patent document 2 discloses in FIG. 1 thereof an arrangement of a receiving apparatus that includes detectors (see reference numerals 102, 103) for detecting received signals deriving from branching-into-two-signal process based on reference signals having a phase difference of 90 deg., a level detector (see reference numeral 112) for detecting an output level of the detectors, a level control signal generator (see reference numeral 114) for generating a level control signal in accordance with the output of the level detector, and a level controllers (see reference numerals 110 and 111) for varying the reference signal level based on the output of the level control signal generator and controlling the output of the detector.

Meanwhile, one of recent technologies known as OFDM (Orthogonal Frequency Division Multiplexing) is drawing attention as a technology that can realize a wide band transmission effectively using a small frequency range and improve the efficiency of frequency band utilization. The OFDM uses frequency orthogonality thereby allows signals to be overlapped on a frequency axis.

In the OFDM, a carrier is divided into a plurality of subcarriers and data is transmitted as parallel data, whereby the symbol rate thereof can be suppressed, transmission rate can be increased and the symbol length can be kept long. Then, the orthogonal m (#1 to #m) subcarriers are arrayed alternately as shown in FIG. 9 for utilization. Thus, interference among the subcarriers can be eliminated, and the subcarriers can be arrayed in a relatively narrow band width BW at a high density.

In more concretely, in a case of transmitter employing the OFDM technology, an IFFT (Inverse Fast Fourier Transform) is effected on the parallel data to transform data in the subcarrier frequency domain into data in the time domain, and thereafter the transformed data is subjected to a quadrature demodulation with a radio frequency signal fRF, for example, to carry out radio transmission.

When a receiver receives the signal transmitted by way of radio transmission, the receiver effects quadrature demodulation on the received signal, and thereafter carries out a processing of Fast Fourier Transform to obtain I/Q data pieces of respective subcarriers as the parallel data of original transmission.

FIG. 10 is a block diagram showing a receiver 110 employing the aforesaid OFDM technology. When a received signal is introduced into the quadrature demodulation unit 104 through the antenna 101, the AGC amplifier 102 and the band-pass filter 103, the quadrature demodulation unit 104 carries out quadrature demodulation processing. Then, the low-pass filters 105*i* and 105*q* remove high frequency components from the received signals. The A/D converters 106*i* and 106*q* convert the received signals into digital signals. This set of processing is carried out in the same manner as that of FIG. 8. However, the arrangement of FIG. 10 is particularly equipped with an FFT (Fast Fourier Transform) unit 108 between the A/D converters 106*i* and 106*q* and the digital demodulation processing 107.

That is, the FFT unit 108 is arranged to convert the I/Q signals supplied from the A/D converters 106*i* and 106*q* into I/Q signals (I1, Q1, . . . ,Im, Qm) for each of the plural number (m) of subcarriers and then output the converted signals to the digital demodulation processing unit 107.

Patent Document 1: Japanese Patent Laid-Open No. 2003-8674

Patent Document 2: Japanese Patent Laid-Open No. HEI 11-252188

However, according to the technology disclosed in the above-introduced Patent Document 1, the signal processing thereof will suffer from influence caused by phase error until the error correction processing comes to have stable accuracy and the feedback control goes into a stable operation mode. For this reason, it is difficult for the received signal to be subjected to phase error correction and amplitude error correction for a certain period of time in which the feedback control goes into a stable operation mode.

Further, according to the technology disclosed in the above-introduced Patent Document 2, there is no discloser contained about a technology which can handle the phase error correction. Therefore, when more improvement is tried in bit error rate, the technology will encounter certain difficulties. Furthermore, since the technology includes a feedback control, it is difficult for the received signal to be subjected to amplitude error correction for a certain period of time in which the feedback control goes into the stable operation mode.

In the receiver 110 employing the OFDM shown in FIG. 10, the quadrature demodulation unit 104 carries out quadrature demodulation processing by using an fRF signal having a single frequency on a signal which is transmitted from a transmitter employing the OFDM technology in a manner described above. That is, owing to the quadrature demodulation processing, it becomes possible to obtain an I-signal and a Q-signal constituting signals which derive from conversion from the frequency domain data into a time domain data by the IFFT processing.

That is, in the above arrangement, the quadrature demodulation is effected over the all frequency domain having the plurality of subcarrier frequency band superposed on one another by using the signal fRF having a common frequency. Therefore, even if the amplitude error correction and the phase error correction are effected on the I-signal and the Q-signal which are obtained by the quadrature demodulation processing, the I-signals and the Q-signals of respective subcarriers will not effectively undergo the amplitude error correction and the phase error correction, with the result that the characteristic of the received signal is not satisfactorily improved.

Accordingly, each of the device characteristics of the quadrature demodulation unit 104, the low-pass filters 105*i* and 105*q*, and the A/D converters 106*i* and 106*q* influences upon each subcarrier signal in a different manner. Therefore, when the amplitude error and the phase error between the I-signal and the Q-signal due to the device characteristics of these components are corrected, it is necessary to correct the amplitude error and the phase error between the I-signal and the Q-signal of each subcarrier for improving the received signal characteristic.

SUMMARY OF THE INVENTION

The present invention is made in view of the above aspect. Therefore, it is an object of the present invention to provide a signal processing circuit, a quadrature demodulation apparatus and a method of estimating error therefor in which it becomes possible to accurately estimate not only amplitude error but also phase error caused in a signal inherent to characteristics of devices such as those constituting a quadrature demodulation unit or the like of a receiver, to correct the estimated error component at a high rate without introducing any feedback control, and to eliminate deterioration in the signal quality.

In order to attain the above object, there is provided a signal processing circuit including a cross-correlation value calculating unit for calculating a cross-correlation value of a pair of signals having undergone a quadrature detection, and a phase error calculating unit for calculating a phase displacement of one of the pair of signals with respect to the other of the same as a phase error based on the cross-correlation value calculated by the cross-correlation value calculating unit.

Further, according to the present invention, there is provided a signal processing circuit including an amplitude error detecting unit for detecting an amplitude displacement of one of a first pair of signals with respect to the other of the same as an amplitude error of the first pair of signals having undergone a quadrature detection, an amplitude error correcting unit for correcting the amplitude error detected by the amplitude error detecting unit, and a phase error detecting unit for detecting a phase displacement of one of a second pair of signals with respect to the other of the same as a phase error of the second pair of signals, the second pair of signals having undergone the amplitude error correction processing in the amplitude error correcting unit.

In this case, it is preferable that the phase error detecting unit is arranged to include a cross-correlation value calculating unit for calculating a cross-correlation value of the second pair of signals having undergone the amplitude error correction, and a phase error calculating unit for calculating a phase displacement of one of the second pair of signals having undergone the amplitude error correction with respect to the other of the same as a phase error based on the cross-correlation value calculated by the cross-correlation value calculating unit.

Further, the above-described signal processing circuit may be arranged to include a phase error correcting unit for correcting phase error detected by the phase error detecting unit.

Further, it is preferable that the cross-correlation value calculating unit may be arranged to include a standard value calculating unit for determining a standard value by carrying out summation calculation on first discrete values supplied thereto for a predetermined period of time, each of the first discrete values being created by squaring a value of one of the second pair of signals having undergone the amplitude error correction, a reference value calculating unit for determining a reference value by carrying out summation calculation on second discrete values generated therefrom for a predetermined period of time, each of the second discrete values being created by calculating product of the pair of signals having undergone the amplitude error correction, and a ratio calculating unit for calculating a ratio value of the standard value relative to the reference value as the cross-correlation value based on the results of calculation deriving from the standard value calculating unit and the reference value calculating unit.

Further, the phase error calculating unit may be composed of an arcsine function calculating unit for calculating an arcsine function corresponding to the ratio value calculated by the ratio calculating unit of the cross-correlation value calculating unit and outputting the result of the calculation as the phase error.

In this case, the signal processing circuit may include a phase error correcting unit for correcting the phase error calculated by the phase error calculating unit, and the phase error correcting unit may be arranged to include a first calculating unit for multiplying one of the second pair of signals having undergone the amplitude error correction with a sine value corresponding to an arcsine function value determined by the arcsine function calculating unit, a second calculating unit for adding the result of calculation deriving from the first calculating unit and a signal value of one of the second pair of signals having undergone the amplitude error correction together, and a third calculating unit for dividing the result of calculation deriving from the second calculating unit with a cosine value corresponding to an arcsine function value determined by the arcsine function calculating unit, and outputting the result of division as a result of the amplitude error correction and the phase error correction.

According to the present invention, there is provided a quadrature demodulation apparatus including a quadrature demodulation unit for effecting quadrature demodulation on a signal having undergone a quadrature frequency division multiplexing with a standard frequency signal, a subcarrier quadrature detection component outputting unit for outputting a couple of quadrature detection components for each of subcarriers deriving from the quadrature frequency division demultiplex of a pair of signals which have been undergone quadrature demodulation in the quadrature demodulation unit, and a signal processing circuit provided for each subcarrier supplying channel supplying a subcarrier from the subcarrier quadrature detection component outputting unit, each of said signal processing circuit having a phase error detecting unit for detecting a phase displacement of one of the couple of quadrature detection components with respect to the other of the same as a phase error, respectively.

The above-described quadrature demodulation apparatus may have a signal processing circuit provided for each subcarrier supplying channel, and the signal processing circuit may be arranged to have an amplitude error detecting unit for detecting an amplitude displacement of one of the couple of quadrature detection components with respect to the other of the same as an amplitude error of the couple of quadrature detection components of the corresponding subcarrier, and an amplitude error correcting unit for correcting the amplitude error detected by the amplitude error detecting unit, wherein the phase error detecting unit detects a phase displacement of one of the couple of quadrature detection components with respect to the other of the same as a phase error of the couple of quadrature detection components having undergone the amplitude correction in the amplitude error correcting unit.

In this case, the quadrature demodulation apparatus may be arranged to have a phase error detecting unit of a signal processing circuit provided for each subcarrier supplying channel, and the phase error detecting unit may be arranged to include a cross-correlation value calculating unit for calculating a cross-correlation value of corresponding couple of quadrature detection components supplied from the subcarrier quadrature detection component outputting unit, and a phase error calculating unit for calculating phase error based on the cross-correlation value calculated by the cross-correlation value calculating unit.

The quadrature demodulation apparatus may further includes a phase error correcting unit for correcting phase error detected by the phase error detecting unit.

Further, the quadrature demodulation apparatus may be arranged to have a cross-correlation value calculating unit of a signal processing circuit provided for each subcarrier supplying channel, and the cross-correlation value calculating unit may be arranged to include a standard value calculating unit for determining a standard value by carrying out summation calculation on first discrete values supplied thereto for a predetermined period of time, each of the first discrete values being created by squaring a value of one of the corresponding couple of quadrature demodulating components, a reference value calculating unit for determining a reference value by carrying out summation calculation on second discrete values supplied thereto for a predetermined period of time, each of the second discrete values being created by calculating product of the corresponding couple of quadrature demodulating components, and a ratio calculating unit for calculating a ratio value of the standard value relative to the reference value as the cross-correlation value based on the results of calculation deriving from the standard value calculating unit and the reference value calculating unit.

In this case, the quadrature demodulation apparatus may have a phase error calculating unit of a signal processing circuit provided for each subcarrier supplying channel, and the phase error calculating unit may be arranged to include an arcsine function calculating unit for calculating an arcsine function corresponding to the ratio value determined by the ratio calculating unit of the cross-correlation value calculating unit and outputting the result of the calculation as the phase error.

In this case, the quadrature demodulation apparatus may be arranged to include a signal processing circuit provided for each subcarrier supplying channel having a phase error correcting unit for correcting the phase error calculated by the phase error calculating unit, and the phase error correcting unit may be arranged to include a first calculating unit for multiplying one of the pair of signals having undergone the amplitude error correction with a sine value corresponding to an arcsine function value determined by the ratio calculating unit, a second calculating unit for adding the result of calculation deriving from the first calculating unit and a signal value of one of the pair of signals having undergone the amplitude error correction together, and a third calculating unit for dividing the result of calculation deriving from the second calculating unit by a cosine value corresponding to the arcsine function value determined by the ratio calculating unit, and outputting the result of division as a result of the amplitude error collection and the phase error correction.

Further, according to the present invention, there is provided a quadrature demodulation apparatus including a changeover switch for selectively establishing one of a test mode connection and a practical mode connection so that one of a test mode signal and a practical mode signal is selectively outputted therefrom, a quadrature demodulation unit for effecting quadrature demodulation on a signal supplied from the changeover switch with a standard frequency signal, an amplitude error detecting unit for detecting an amplitude displacement of one of a pair of signals with respect to the other of the same as an amplitude error of the pair of signals which have been undergone the quadrature demodulation in the quadrature demodulation unit, a phase error detecting unit for detecting a phase displacement of one of the pair of signals with respect to the other of the same as a phase error of the pair of signals which have been undergone the quadrature demodulation in the quadrature demodulation unit, a memory unit for memorizing the amplitude error and the phase error detected by the amplitude error detecting unit and the phase error detecting unit, an amplitude error correcting unit for correcting the amplitude error of the pair of signals which have been undergone the quadrature demodulation in the quadrature demodulation unit based on the amplitude error memorized in the memory unit, a phase error correcting unit for correcting the phase error of the pair of signals which have been undergone the quadrature demodulation in the quadrature demodulation unit based on the phase error memorized in the memory unit, and a control unit for controlling the changeover switch so that the changeover switch selects one of the test mode connection and the practical mode connection depending on the desired mode, wherein when the test mode is selected, the control unit controls the amplitude error detecting unit and the phase error detecting unit so that the amplitude error and the phase error detected by the amplitude error detecting unit and the phase error detecting unit are memorized in the memory unit, and when the practical mode is selected, the control unit controls the amplitude error correcting unit and the phase error correcting unit so that correction is made in accordance with the contents memorized in the memory unit, on the amplitude error and the phase error of the pair of signals which have been undergone the quadrature demodulation in the quadrature demodulation unit.

Further, according to the present invention, there is proposed a method of estimating error for use with a quadrature demodulation apparatus having a quadrature demodulation unit and a signal processing circuit, the quadrature demodulation unit being for effecting quadrature demodulation on a signal having undergone a quadrature frequency division multiplexing with a standard frequency signal, and the signal processing circuit being for carrying out signal processing on a couple of quadrature detection components having undergone the quadrature detection in the quadrature demodulation unit, the method of estimating error comprising a group of steps for a test mode, the group of steps for the test mode including steps of outputting the couple of quadrature detection components deriving from subjecting a test signal to the quadrature demodulation in the quadrature demodulation unit, detecting an amplitude displacement of one of the couple of components with respect to the other of the same as amplitude error of the quadrature detection components generated in the step of outputting the quadrature detection components, memorizing the amplitude error detected in the step of detecting the amplitude error, detecting a phase displacement of one of the couple of components with respect to the other of the same as phase error of the couple of quadrature detection components generated in the step of outputting the quadrature detection components, and memorizing the phase error detected in the step of detecting the phase error.

According to the present invention, there is proposed a method of correcting error for use with a quadrature demodulation apparatus having a quadrature demodulation unit and a signal processing circuit, the quadrature demodulation unit being for effecting quadrature demodulation on a signal having undergone a quadrature frequency division multiplexing with a standard frequency signal and the signal processing circuit being for carrying out signal processing on a couple of quadrature detection components having undergone the quadrature detection in the quadrature demodulation unit, the method of correcting error comprising a group of steps for a test mode and a group of steps for a practical mode, the group of steps for the test mode including steps of outputting the couple of quadrature detection components deriving from subjecting a test signal to the quadrature demodulation in the quadrature demodulation unit, detecting an amplitude displacement of one of the couple of components with respect to the other of the same as amplitude error of the quadrature detection components generated in the step of outputting the quadrature detection components, memorizing the amplitude error detected in the step of detecting the amplitude error, detecting a phase displacement of one of the couple of components with respect to the other of the same as phase error of the couple of quadrature detection components generated in the step of outputting the quadrature detection components, and memorizing the phase error detected in the step of detecting the phase error, and the group of steps for the practical mode comprising steps of correcting the amplitude error of the couple of quadrature detection components upon the practical mode based on the amplitude error memorized in the step of memorizing the amplitude error, and correcting the phase error of the couple of quadrature detection components upon the practical mode based on the phase error memorized in the step of memorizing said phase error.

As described above, according to the present invention, owing to the cross-correlation value calculating unit and the phase error calculating unit of the phase error detecting unit, even if the components constituting the receiver have inherent characteristics, i.e., these device characteristics of the components constituting the receiver cause the phase error between the I-component and the Q-component, it becomes possible to carry out accurate estimation on the phase error by additionally providing the signal processing circuit function with a simple arrangement at a stage for carrying out the baseband processing. Therefore, signal deterioration can be eliminated by correcting the phase error, and the S/N ratio and the bit error rate can be improved.

In particular, if signal transmission is requested for a signal necessitating a relatively high S/N ratio such as one using a multi-code in a spread spectrum demodulation or one using a multi-value demodulation, the requested level of S/N ratio can be secured.

Further, when the phase error correction is carried out, the correction can be achieved without providing a feedback control. Therefore, the phase error can be accurately estimated as described above, and the circuit for carrying out the phase error correction comes to have a high response speed.

Furthermore, the amplitude error detecting unit and the amplitude error correcting unit are provided on the upstream side relative to the stage of the phase error detection in the phase error detecting unit, and the amplitude error correction is made prior to the phase error detection. Therefore, the phase error can be detected at a higher accuracy.

As described above, according to the present invention, since the phase error detecting unit is provided in each of the signal processing circuit modules, in addition to the advantages similar to those of the aforesaid case, the phase error detection on the OFDM signal in particular can be carried out for each of the subcarriers independently. That is, as for the OFDM signal, it is assumed that the phase error between the I-component and the Q-component can be caused in a different manner depending on each subcarrier by the characteristics inherent to the components constituting the receiver. However, if some simple signal processing circuit function is added to a stage for carrying out the baseband processing, then the phase error caused depending on each subcarrier can be estimated accurately and at a high speed. Accordingly, the S/N ratio and the bit error rate characteristic can be remarkably improved.

Furthermore, the control unit can function as a unit for controlling the amplitude error detecting unit and the phase error detecting unit so that when the test mode is selected the amplitude error and the phase error detected by the amplitude error detecting unit and the phase error detecting unit are stored in the amplitude error holding unit and the phase error holding unit, respectively. Also, the control unit can function as a unit for controlling the amplitude error correcting unit and the phase error correcting unit so that when the practical mode is selected the amplitude error correcting unit and the phase error correcting unit effect the amplitude error correction and the phase error correction on the couple of signals driving from the quadrature demodulation in the quadrature demodulation unit based on the contents stored in the amplitude error holding unit and the phase error holding unit, respectively. Therefore, when the mode selection is made to take place the practical mode in which the receiving processing is effected on the signal transmitted through the actual radio wave transmission channel, this receiving processing can be carried out in a simple manner by the signal processing circuit module provided for each subcarrier, with the result that processing load imposed on the overall arrangement of the apparatus can be decreased.

BRIEF DESCRIPTION OF THE DRAWINGS

FIGS. 11a to 11c are all diagrams for explaining amplitude error; and

FIGS. 12a to 12c are all diagrams for explaining phase error.

DESCRIPTION OF THE PREFERRED EMBODIMENTS

Embodiments of the present invention will be hereinafter described with reference to drawings.

[a] Description of First Embodiment

Figure 1:
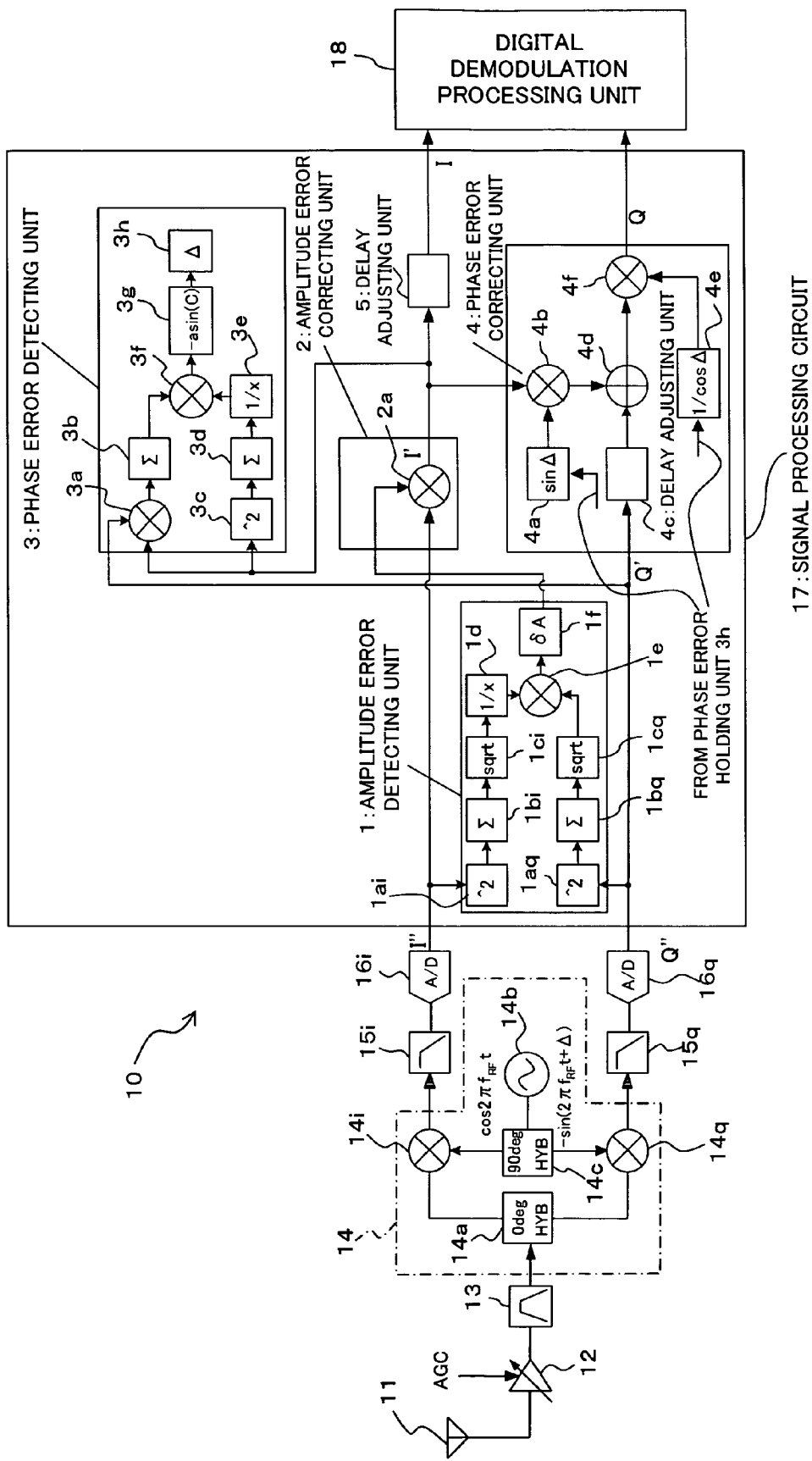
FIG. 1 is a block diagram showing a receiver according to a first embodiment of the present invention.

FIG. 1 is a block diagram showing a receiver 10 of a first embodiment according to the present invention. The receiver 10 shown in FIG. 1 is capable of receiving a signal transmitted from a transmitter not shown, for example.

When the transmitter transmits a data signal, the transmitter effects quadrature demodulation on the data signal so that the signal is sent as a radio wave frequency signal. As will be described later on, the receiver 10 shown in FIG. 10 has an arrangement with a feature of the present invention which can effect estimation and correction on amplitude error and phase error which can be brought about due to the inherent characteristics of devices for data demodulation processing in the prior processing stage.

As shown in FIG. 1, the receiver 10 has an antenna 11, an AGC amplifier 12, a band-pass filter 13, a quadrature detection unit 14, low-pass filters 105$i$ and 105$q$, A/D converters 16$i$ and 16$q$ and a digital demodulation processing unit 18. These components have fundamentally the same functions as those of the corresponding components illustrated in aforesaid FIG. 8 (see reference numerals 101 to 104, 105$i$, 105$q$, 106$i$, 106$q$, 107). The receiver 10 further comprises a signal processing circuit 17 having the arrangement with a feature of the present invention.

Figure 8:
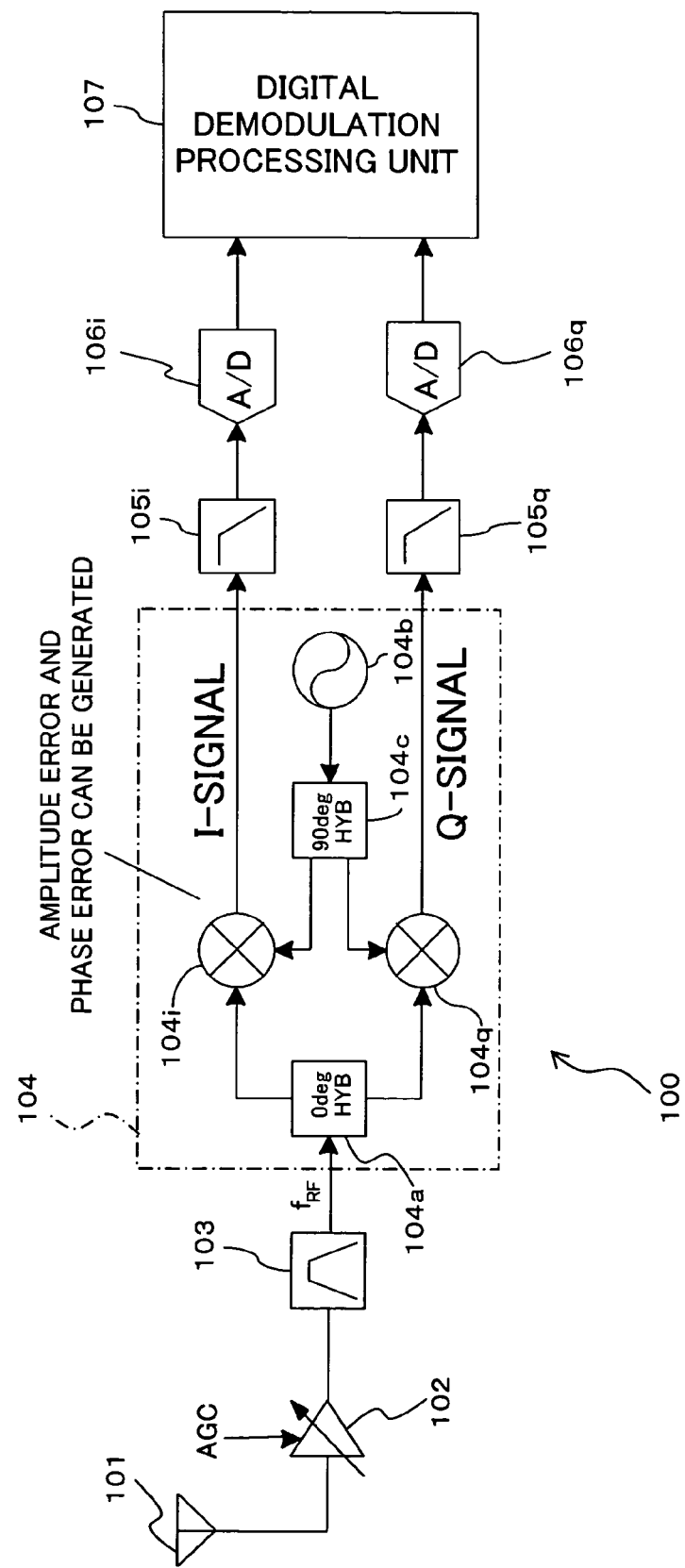
FIG. 8 is a block diagram showing an arrangement of a general receiver.
Figure 9:
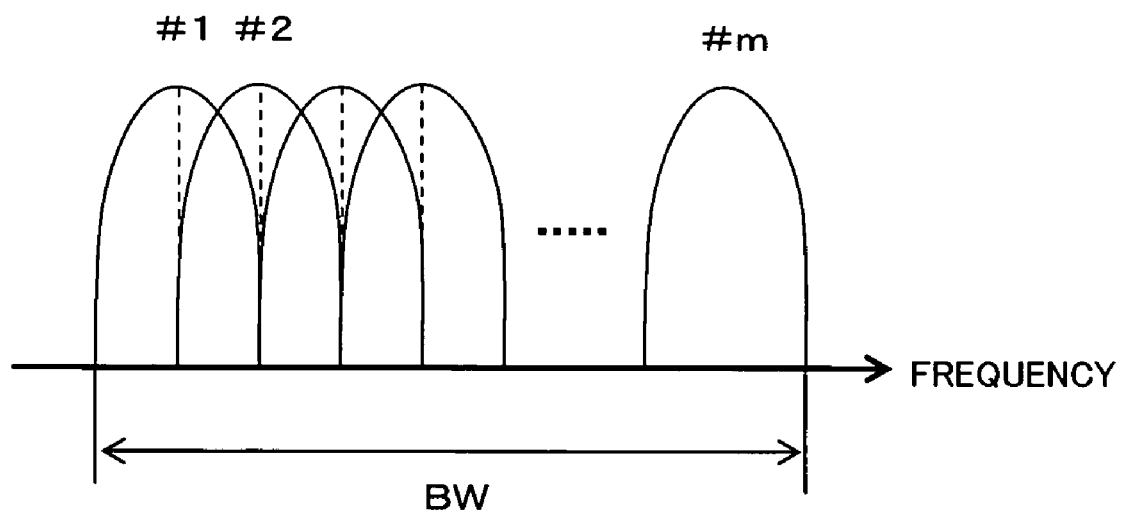
FIG. 9 is a diagram for explaining distribution of subcarriers orthogonal to one another on the basis of OFDM technology.

Similarly to the aforesaid case of FIG. 8, the quadrature detection unit 14 comprises a zero-degree hybrid (0-deg HYB) 14$a$ for branching the received signal passing through the band-pass filter 13 into two signal flows, a local oscillator 14$b$ for outputting a local signal having the same frequency as that with which the signal has undergone the quadrature demodulation, a ninety-degree hybrid (90-deg HYB) 14$c$ for outputting a couple of local signals having a phase shifted by 90 degrees with respect to that local signal, mixers 14$i$ and 14$q$.

In FIG. 1, the ninety-degree hybrid 14$c$ is supposed to have a deviation of a distribution angle of 90 degrees. The local signal supplied to the mixer 14$q$ has a piece of relative phase error $\Delta$ with respect to the local signal supplied to the mixer 14$i$. Thus, the local signal supplied to the mixer 14$i$ is denoted as $\cos 2\pi fRFt$ while the local signal supplied to the mixer 14$q$ is denoted as $\sin(2\pi fRFt+\Delta)$.

The mixers 14$i$ and 14$q$ are components for multiplying the couple of radio wave frequency signals branched by and generated from the aforesaid zero-degree hybrid 14$a$ with the couple of local signals outputted from the ninety-degree hybrid 14$c$, respectively. Thus, the mixer 14$i$ can output the I-signal and the mixer 14$q$ can output the Q-signal, respectively, as baseband signals having an orthogonality relative to each other.

The signal processing circuit 17 is a component having the feature of the present invention. That is, this signal processing circuit has functions of estimation and correction on the amplitude error and the phase error which are caused when a stage prior to the data demodulation processing carries out the corresponding processing due to the inherent characteristics of devices (in this case, for example, the aforesaid zero-degree hybrid 14$a$ and the ninety-degree hybrid 14$c$ of the quadrature detection unit 14, the low-pass filters 15$i$ and 15$q$, the A/D converters 16$i$ and 16$q$). A set of components from the above-described quadrature detection unit 14 to the signal processing circuit 17 which is provided on the upstream side of the digital demodulation processing circuit 18, can be referred to as a quadrature demodulation apparatus.

The signal processing circuit 17 is composed of an amplitude error detecting unit 1, an amplitude error correcting unit 2, a phase error detecting unit 3, a phase error correcting unit 4, and a delay adjusting unit 5. In this signal processing circuit 17, the estimation and the correction are made on the relative amplitude error and phase error between the I"-signal and the Q"-signal which are outputted from the A/D converters 16$i$ and 16$q$.

Further, the amplitude error detecting unit 1 is a unit for detecting an amplitude displacement of one of the couple of signals with respect to the other of the same as the amplitude error of the couple of signals (in this case, the I"-signal and the Q"-signal outputted from the A/D converters 16$i$ and 16$q$) having undergone the quadrature detection. The amplitude error correcting unit 2 is a unit for correcting the amplitude error detected by the amplitude error detecting unit 1. In the present embodiment, as will be described later on, an amplitude error of the I"-signal with respect to the Q"-signal is detected by the amplitude error detecting unit 1. The amplitude error correcting unit 2 carries out amplitude error correction on the I"-signal by using the detected amplitude error. The resulting signal is outputted as an I'-signal.

The phase error detecting unit 3 is a unit for detecting a phase displacement of one of the couple of signals with respect to the other of the same as the phase error of the couple of signals [in this case, the I'-signal and the Q'-signal (Q"-signal)] having undergone the amplitude correction in the amplitude error correcting unit 2. The phase error correcting unit 4 is a unit for correcting the phase error detected by the phase error detecting unit 3. In the present embodiment, as will be described later on, a phase error of the Q'-signal with respect to the I'-signal is detected by the phase error detecting unit 3. The phase error correcting unit 4 carries out phase error correction on the Q'-signal by using the detected phase error. Thus, a Q-signal as a result of the amplitude error correction and the phase error correction is outputted.

The delay adjusting unit 5 is arranged so that the I'-signal is given a delay of a time period which corresponds to one required for correcting the phase error of the Q'-signal in the phase error correcting unit 4, and thereafter the result of the phase error correction is outputted as an I-signal. In this way, the above-described I-signal and the Q-signal can be outputted at the same time. As for the above-described manner of handling the I"-signal and the Q"-signal, the amplitude error correction is carried out prior to the phase error correction. With this correction sequence, it becomes possible to detect the phase error at a higher accuracy as compared with a case in which the phase error is detected without correcting the amplitude error in advance.

The amplitude error detecting unit 1 is a unit for calculating an amplitude error $\delta A$ of the I"-signal with respect to the Q"-signal expressed by the following Equation (1), for example. In more concretely, the amplitude error detecting unit 1 comprises square calculation units 1$ai$ and 1$aq$, total sum calculating units 1$bi$ and 1$bq$, square root calculating units 1$ci$ and 1$cq$, a reciprocal number calculating unit 1$d$ and a multiplier 1$e$. For example, difference is taken from the averaged amplitude value of the I-signal and the Q-signal, the amplitude error $\delta A$ of the Q-signal with respect to the I-signal is determined by the difference, and the determined result is held in an amplitude error holding unit 1$f$.

The I"-signal and the Q"-signal are supplied as digital signals from the A/D converters 16$i$ and 16$q$ to the square calculating units 1$ai$ and 1$aq$ in which squared values are calculated for respective signals, respectively. Then, the total sum calculating units 1$bi$ and 1$bq$ calculate the total sum of the square values supplied thereto for a predetermined period of time [total sum of (n+1) values supplied thereto for the predetermined period of time]. Further, the square root calculating units 1$ci$ and 1$cq$ calculate the square roots of the total sums, respectively, to determine the averaged amplitude values of respective components. Thereafter, the reciprocal number calculating unit 1$di$ and the multiplier 1$e$ determine the ratio of the averaged amplitude values of the Q"-signal to that of the I"-signal. The obtained ratio is determined as the amplitude error δ A and held in the amplitude error holding unit 1*f*.

$$\delta A = \frac{averaged\, value\, of\ Q'' - amplitudes}{averaged\, value\, of\ I'' - amplitudes} = \frac{\sqrt{\frac{\sum_{0}^{N}(Q''_n)^2}{N}}}{\sqrt{\frac{\sum_{0}^{N}(I''_n)^2}{N}}} = \frac{\sqrt{\sum_{0}^{N}(Q''_n)^2}}{\sqrt{\sum_{0}^{N}(I''_n)^2}} \quad (1)$$

As described above, the detection (estimation) of the amplitude error is obtained from the difference between the averaged amplitude values of the I"-signal and the Q"-signal. If there is no amplitude error, the difference between the averaged amplitude values of the I"-signal and the Q"-signal becomes zero and hence the amplitude error δ A becomes "1". While in the present embodiment the amplitude error is determined as that of the I"-signal with respect to the Q"-signal as a reference, the amplitude error may be determined as that of the Q"-signal with respect to the I"-signal as a reference.

As expressed by the following Equation (2), the amplitude error correcting unit 2 multiplies the value of δ A held in the amplitude error holding unit 1*f* with the I"-signal and outputs the resultant signal as the I'-signal. In this case, the Q"-signal is utilized as a reference for correcting the amplitude error of the I"-signal. Therefore, as expressed by the following Equation (3), the Q"-signal can be directly replaced with the Q'-signal. In order for carrying out the above calculation, the amplitude error correcting unit 2 is arranged to include the multiplying unit 2*a* for multiplying the I"-signal outputted from the A/D converter 16*i* with the value of δ A held in the amplitude error holding unit 1*f*.

$$I_n' = I_n'' \times \delta A \quad (2)$$

$$Q_n' = Q_n'' \quad (3)$$

Furthermore, the phase error detecting unit 3 calculates a normalized cross-correlation value C, as expressed by the following Equation (4), of the couple of signals (I'-signal and Q'-signal) having undergone the amplitude error correction in the amplitude error correcting unit 2. In order for carrying out the calculation expressed by Equation (4), the phase error detecting unit 3 is arranged to include a multiplying unit 3*a*, a total sum calculating unit 3*b*, a square calculating unit 3*c*, a total sum calculating unit 3*d*, a reciprocal number calculating unit 3*e* and a multiplier 3*f*.

$$C = \frac{\sum_{k=0}^{n}(I_k' \times Q_k')}{\sum_{0}^{n}(I_k')^2} \quad (4)$$

That is, the multiplying unit 3*a* multiplies the I'-signal and the Q'-signal together and the total sum calculating unit 3*b* calculates the total sum for a constant period of time [total sum of n+1 values supplied thereto for the constant period of time] about the results of the multiplying unit 3*a*. The square calculating unit 3*c* calculates the square of the Q'-signal, the total sum calculating unit 3*d* calculates the total sum of the results of calculation supplied from the multiplying unit 3*c* for a constant period of time. The reciprocal number calculating unit 3*e* and the multiplying unit 3*f* calculate the ratio of the calculation result of the total sum calculating unit 3*c* to the calculation result of the total sum calculating unit 3*d*. The obtained value is defined as the cross-correlation value C.

Subsequently, the phase error detecting unit 3 estimates the phase error Δ [degree] expressed by the following Equation (5) by using the value obtained by the aforesaid Equation (4). To this end, the phase error detecting unit 3 is arranged to include, in addition to the arrangement for obtaining the above-described cross-correlation value (see reference numerals 3*a* to 3*f*), an arcsine function calculating unit 3*g* and a phase error holding unit 3*h*. Description will be made later on why the phase error can be obtained by Equation (5).

$$\text{phase error } \Delta = a\sin(-C) \quad (5)$$

If the signal contains the phase error as described above, it is useful for determining the phase deviation between the I'-signal and the Q'-signal to calculate the cross-correlation value C defined by Equation (4). With this calculation, an I-component contained in the Q'-signal can be obtained. While in the present embodiment the phase error is determined as that of the Q'-signal by using the phase of the I'-signal as a reference, the phase error may be determined as that of the I'-signal by using the phase of the Q'-signal as a reference.

Accordingly, the above-described components, i.e., the multiplying unit 3*a*, the total sum calculating unit 3*b*, the square calculating unit 3*c*, the total sum calculating unit 3*d*, the reciprocal number calculating unit 3*e* and the multiplying unit 3*f* can function as a cross-correlation value calculating unit for calculating a cross-correlation value of the couple of signals (the I'-signal and the Q'-signal) having undergone (the amplitude error correction and) the quadrature demodulation. Further, the arcsine function calculating unit 3*g* can function as a phase error calculating unit for calculating the phase deviation of one of the couple of signals with respect to the other of the same, having undergone (the amplitude error correction and) the quadrature demodulation, as a phase error.

Further, the square calculating unit 3*c* and the total sum calculating unit 3*d* function as a standard value calculating unit for determining a standard value by carrying out summation calculation on discrete values supplied thereto for a predetermined period of time, each of the discrete values being created by squaring a value of one of the couple of signals having undergone the amplitude error correction. The multiplying unit 3*a* and the total sum calculating unit 3*b* function as a reference value calculating unit for determining a reference value by carrying out summation calculation on discrete values generated there from for a predetermined period of time, each of the discrete values being created by calculating product of the pair of signals having undergone the amplitude error correction. In addition, the reciprocal number calculating unit 3*e* and the multiplying unit 3*f* function as a ratio calculating unit for calculating a ratio value of the standard value relative to the reference value as the cross-correlation value based on the results of calculation deriving from the standard value calculating unit and the reference value calculating unit.

Furthermore, the arcsine function calculating unit 3*g* as the phase error calculating unit is arranged as a unit for calculating an arcsine function [a sin(−C)] corresponding to (a polar inversion value of) the ratio value which is calculated by the ratio calculating unit of the cross-correlation value calculating unit and outputting the calculation result as the phase error Δ.

The phase error correcting unit 4 is a unit for carrying out phase error correction on the Q'-signal as expressed by the following equation (7) by using the phase error Δ held in the phase error holding unit 3$h$. The I'-signal is utilized as a reference for correcting the phase error of the Q'-signal. Therefore, as expressed by the following Equation (6), the signal with a value having undergone the phase error correction (I-signal) can be directly derive from the I'-signal.

$$I' \to I \quad (6)$$

$$(Q'+I' \sin \Delta)/\cos \Delta Q \quad (7)$$

For this reason, the phase error correcting unit 4 is arranged to include a sine function calculating unit 4$a$ for calculating a sine function sin Δ of the phase error Δ which is held in the phase error holding unit 3$h$, a multiplying unit 4$b$ for multiplying the I'-signal with the value of the sine function sin Δ from the sine function calculating unit 4$a$, a delay adjusting unit 4$c$ for effecting delay adjustment on the Q'-signal, an adding unit 4$d$ for adding the delay-adjusted signal from the delay adjusting unit 4$c$ and the Q'-signal corresponding to the I'-signal×sin Δ as a result of multiplication in the multiplying unit 4$b$ together, a cosine function calculating unit 4$e$ for calculating a reciprocal number, 1/cos Δ of a cosine function of the phase error Δ which is held in the phase error holding unit 3$h$, and a multiplying unit 4$f$ for multiplying the calculation result of the adding unit 4$d$ and the calculation result of the cosine function calculating unit 4$e$ together.

In other words, the sine function calculating unit 4$a$ and the multiplying unit 4$b$ function as a first calculating unit for multiplying one of the couple of signals (in this case, the I'-signal) having undergone the amplitude error correction with a sine value (sin Δ) corresponding to the arcsine function value determined by the arcsine function calculating unit 3$g$. The delay adjusting unit 4$c$ and the adding unit 4$d$ function as a second calculating unit for adding the result of calculation deriving from the first calculating unit and a signal value of one of the couple of signals (in this case, the Q'-signal) having undergone the amplitude error correction together.

Further, the cosine function calculating unit 4$e$ and the multiplying unit 4$f$ can serve as a third calculating unit for dividing the result of calculation deriving from said second calculating unit with a cosine value corresponding to the arcsine function value determined by the arcsine function calculating unit 3$g$, and outputting the result of division together with the amplitude error of the other of the couple of signals as a phase error corrected result.

In this way, in the signal processing circuit 17, the result of multiplication in the multiplying unit 4$f$ can be outputted as the Q-signal having undergone the phase error correction together with the I-signal generated from the delay adjusting unit 5 to the digital demodulation processing unit 18.

Figure 2:
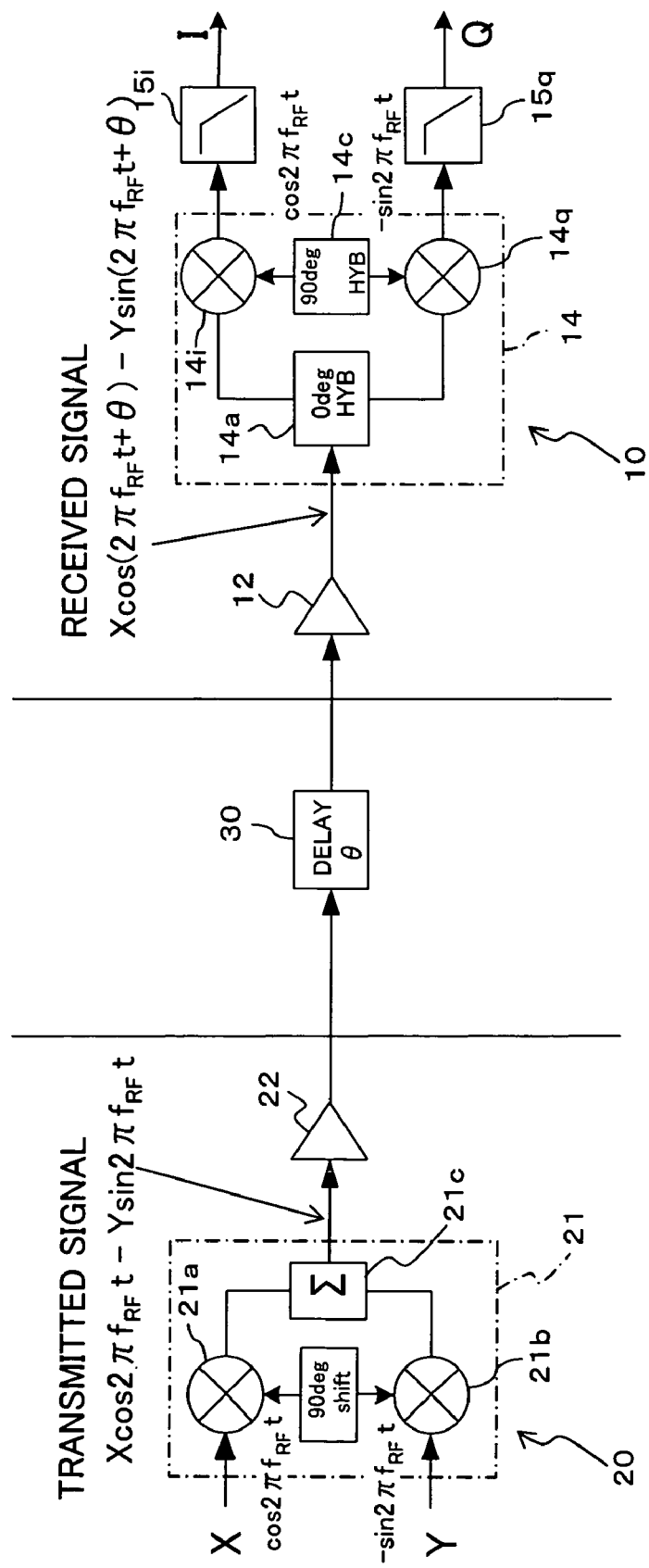
FIG. 2 is a diagram for explaining the first embodiment of the present invention.

Now description will be fully made on why the phase error Δ can be obtained by Equation (5) with reference to FIG. 2 which illustrates a radio wave signal transmission-reception system.

For convenience of explanation, a case is supposed such that a phase error is requested to determine for the I'-signal and the Q'-signal which contain no amplitude error. As shown in FIG. 2, X and Y are taken as an I-component and a Q-component, respectively, which constitute signals to be sent from a side of transmitter 20. Further, fRF is taken as a local frequency for carrying out quadrature demodulation. Then the transmitting signal T can be expressed as Equation (8). If θ is taken as a delay due to the wireless network 30, then a received signal at a receiver 10 can be expressed as Equation (9).

As shown in FIG. 2, the transmitter 20 includes a quadrature demodulation unit 21 having a mixer 21$a$, a mixer 21$b$ and adding unit 21$c$. The mixer 21$a$ multiplies "X" as the I-component constituting the signal to be transmitted and a local frequency, cos 2π fRFt together. The mixer 21$b$ multiplies "Y" as the Q-component constituting the same signal and a local frequency, −sin 2π fRFt together. The adding unit 21$c$ adds the I-component and the Q-component together to obtain the transmitting signal T expressed as Equation (8). In this way, the transmitting signal T is transmitted through a power amplifier 22 and an antenna not shown as a radio wave signal.

$$T = X \cos 2\pi f_{RF}t - Y \sin 2\pi f_{RF}t \quad (8)$$

$$R = X \cos(2\pi f_{RF}t + \theta) - Y \sin(2\pi f_{RF}t + \theta) \quad (9)$$

Now comparison is made between a case in which there is phase error in the I'-signal and the Q'-signal having undergone quadrature demodulation after amplitude error correction and a case in which there is no phase error in the same couple of signals.

Initially, if the signals having no phase error contained therein is defined as I'=I and Q'=Q, the I-signal can be expressed as Equation (10).

$$\begin{aligned} I &= \{X\cos(2\pi f_{RF}t + \theta) - Y\sin(2\pi f_{RF}t + \theta)\} \times \cos(2\pi f_{RF}t) \quad (10)\\ &= X\cos(2\pi f_{RF}t + \theta) \cdot \cos(2\pi f_{RF}t) - Y\sin(2\pi f_{RF}t + \theta) \cdot \\ &\quad \cos(2\pi f_{RF}t)\\ &= \{X\cos(2 \times 2\pi f_{RF}t + \theta) + X\cos(\theta)\}/2 - \\ &\quad \{Y\sin(2 \times 2\pi f_{RF}t + \theta) + Y\sin(\theta)\}/2\\ &= \{X\cos(2 \times 2\pi f_{RF}t + \theta) - Y\sin(2 \times 2\pi f_{RF}t + \theta) + \\ &\quad X\cos(\theta) - Y\sin(\theta)\}/2 \end{aligned}$$

Then, filtering is effected by the low-pass filter 15$i$ (see FIG. 1) on the value obtained by the above Equation (10) to remove 2×2 π fRF frequency components. Thus, there is obtained the I-signal expressed by the following Equation (11).

$$I = [X \cos(\theta) - Y \sin(\theta)]/2 \quad (11)$$

Further, the Q-signal output when no error is contained in the amplitude component and the phase component can be expressed as the following equation (12).

$$\begin{aligned} Q &= X\cos(2\pi f_{RF}t + \theta) - Y\sin(2\pi f_{RF}t + \theta) \times \{-\sin(2\pi f_{RF}t)\} \quad (12)\\ &= -X\cos(2\pi f_{RF}t + \theta) \cdot \sin(2\pi f_{RF}t) + Y\sin(2\pi f_{RF}t + \theta) \cdot \\ &\quad \sin(2\pi f_{RF}t)\\ &= -\{X\sin(2 \times 2\pi f_{RF}t + \theta) + X\sin(-\theta)\}/2 - \\ &\quad \{Y\cos(2 \times 2\pi f_{RF}t + \theta) - Y\cos(\theta)\}\\ &= \{-X\sin(2 \times 2\pi f_{RF}t + \theta) - Y\cos(2 \times 2\pi f_{RF}t + \theta) + \\ &\quad X\sin(\theta) + Y\cos(\theta)\}/2 \end{aligned}$$

Then, filtering is effected by the low-pass filter 15$q$ (see FIG. 1) on the value obtained by the above Equation (12) to remove 2×2 π fRF frequency components. Thus, there is obtained the Q-signal expressed by the following Equation (13).

$$Q=[X\sin(\theta)+Y\cos(\theta)]/2 \quad (13)$$

Subsequently, if there is contained phase error in the received signal, this is taken as that deviation is brought about by Δ [degree] in the local wave of the Q-component of the received signal. That is, the local frequency component, $-\sin 2\pi$ fRFt multiplied to Y as the Q-component in the transmitter 20 can be expressed as $-\sin(2\pi$ fRFt+Δ). This error component Δ can be imagined to be a phase error deriving from not only the device characteristic of the 90-degree hybrid 14c but also the zero-degree hybrid 14a superposed on each other.

In this case, the output signal of the quadrature demodulation becomes a set of signals of the I'-signal and the Q'-signal containing phase error, and the I'-signal and the Q'-signal can be expressed as the following Equations (14) and (15), respectively.

$$\begin{aligned}
I' &= \{X\cos(2\pi f_{RF}t+\theta) - Y\sin(2\pi f_{RF}t+\theta)\} \times \cos(2\pi f_{RF}t) \quad (14)\\
&= [X\cos(\theta) - Y\sin(\theta)]/2
\end{aligned}$$

$$\begin{aligned}
Q' &= \{X\cos(2\pi f_{RF}t+\theta) - Y\sin(2\pi f_{RF}t+\theta)\} \times \quad (15)\\
&\quad \{-\sin(2\pi f_{RF}t+\Delta)\}\\
&= -X\cos(2\pi f_{RF}t+\theta)\cdot\sin(2\pi f_{RF}t+\Delta)+\\
&\quad Y\sin(2\pi f_{RF}t+\theta)\cdot\sin(2\pi f_{RF}t+\Delta)\\
&= -\{\sin(2\times 2\pi f_{RF}t+\theta+\Delta)+\sin(-\theta+\Delta)\}/2 - \\
&\quad \{Y\cos(2\times 2\pi f_{RF}t+\theta+\Delta) - \cos(-\theta+\Delta)\}/2\\
&= \{-X\sin(2*2\pi f_{RF}t+\theta+\Delta) - Y\cos(2*2\pi f_{RF}t+\theta+\Delta)+\\
&\quad X\sin(\theta-\Delta)+Y\cos(\theta-\Delta)\}/2
\end{aligned}$$

Then, filtering is effected by the low-pass filter 15q (see FIG. 1) on the result of calculation for the Q'-signal to remove 2×2 π fRF frequency components. Thus, there is obtained the Q'-signal expressed by the following Equation (16).

$$Q'=[X\sin(\theta-\Delta)+Y\cos(\theta-\Delta)]/2 \quad (16)$$

Now comparison is made on the values of I and Q components when the phase error is contained and no phase error is contained. As for the I-components, as is expressed by Equations (11) and (14), the signal values thereof become equal to each other regardless of that the phase error is contained and no phase error is contained. Therefore, relationship of Equation (17) holds.

$$I'=I \quad (17)$$

Comparison is made on Q-components. Equation (16) for determining the value of Q'-signal when the phase error is contained therein is developed as expressed in Equation (18).

$$\begin{aligned}
Q' &= X\sin\theta\cos\Delta - X\cos\theta\sin\Delta + Y\cos\theta\cos\Delta + Y\sin\theta\sin\Delta \quad (18)\\
&= (X\sin\theta + Y\cos\theta)\cos\Delta - (X\cos\theta - Y\sin\theta)\sin\Delta
\end{aligned}$$

The contents in parentheses of the first term is equal to the aforesaid Equation (13), and the contents in parentheses of the second term is equal to the aforesaid Equation (11). Therefore, these contents can be replaced with Q and I, respectively, and as a consequence, Q' can be expressed by the following Equation (19).

$$Q'=Q\cos\Delta-I\sin\Delta \quad (19)$$

Equation (19) is an equation relating to the Q'-signal as an output of the quadrature demodulation unit when there is phase error contained in the signal. If this equation is solved for Q, Equation (21) is obtained. That is, together with Equation (21), Equation (20) expressing the value of the I-signal defines the set of I and Q components having no phase error contained therein.

$$I=I' \quad (20)$$

$$Q=(Q'+I\sin\Delta)/\cos\Delta \quad (21)$$

If the phase error Δ is determined by the above Equations (20) and (21), a signal having no phase error contained therein can be determined from the signal having the phase error contained therein. That is, if Q'-signal is added with I sin Δ and the resultant value is multiplied with 1/cos Δ, the Q-signal having no phase error contained can be led.

Subsequently, the aforesaid Equation (5), i.e., an equation for estimating the phase error will be more fully discussed.

If the phase error is contained in the signal, the outputs of the quadrature detection unit 14 are I'-signal and Q'-signal expressed by Equations (17) and (19), respectively. In this case, the normalized cross-correlation value C can be expressed by the following Equation (22).

$$\begin{aligned}
C &= \frac{\sum_{k=0}^{n}(I'_k \times Q'_k)}{\sum_{k=0}^{n}(I'_k)^2} \quad (22)\\
&= \frac{\sum_{k=0}^{n}\{I_k \times (Q_k\cos\Delta - I_k\sin\Delta)\}}{\sum_{k=0}^{n}(I_k)^2}\\
&= \frac{-\sin\Delta\sum_{k=0}^{n}(I_k)^2 + \cos\Delta\sum_{k=0}^{n}(I_k Q_k)}{\sum_{k=0}^{n}(I_k)^2}
\end{aligned}$$

The summation terms of the second sigma of the numerator of Equation (22) is a set of terms determining a cross-correlation value of the I-signal and the Q-signal when there is no phase error contained. Since there is no correlation between the I-signal and the Q-signal having no phase error contained therein, this second term becomes zero. Therefore, the cross-correlation value C can be given as Equation (23). On the basis of the cross-correlation value, the phase error can be estimated as expressed by Equation (24).

$$C=-\sin\Delta \quad (23)$$

$$\Delta=a\sin(-C) \quad (24)$$

Figure 3:
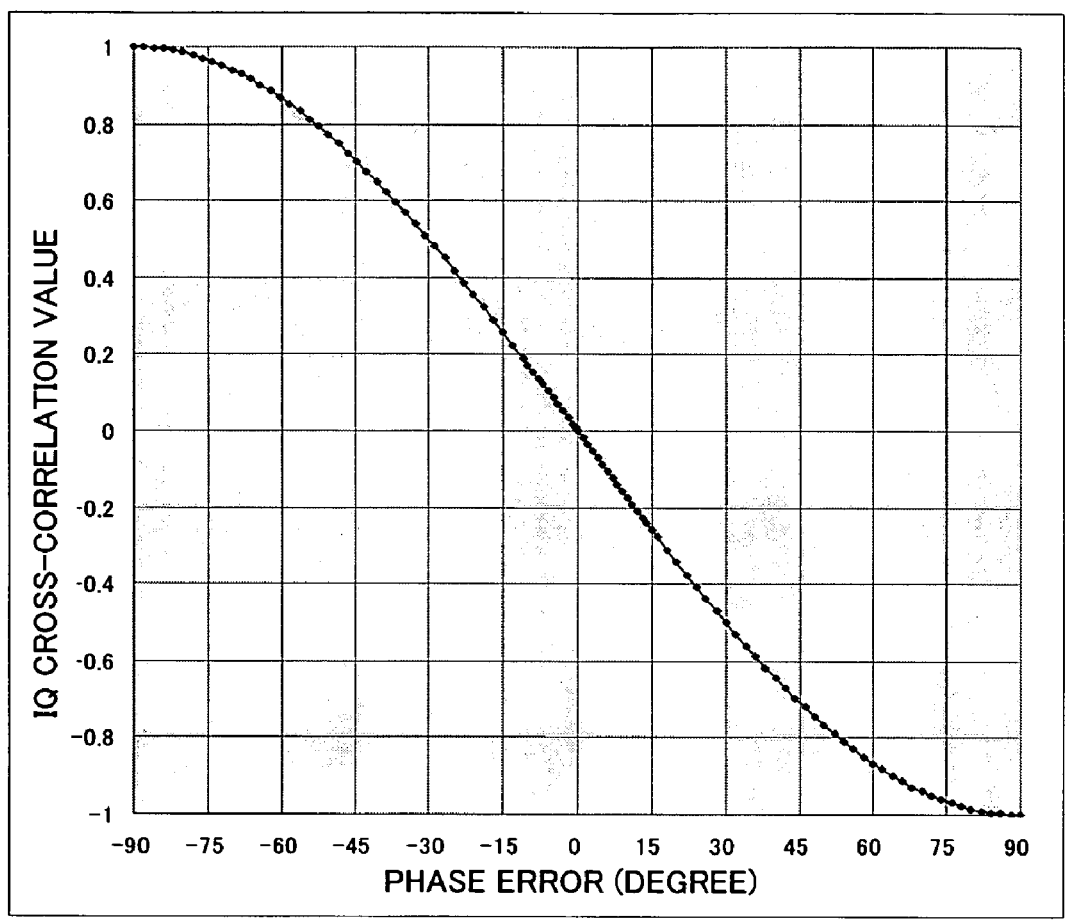
FIG. 3 is a diagram illustrating the relationship between a cross-correlation value and phase error of the first embodiment of the present invention.

Since the phase error Δ can be given by the above equation (24), the relationship between the cross-correlation value C and the phase error Δ becomes as illustrated in FIG. 3.

As described above, if a signal is received by the arrangement of the receiver 10 according to the first embodiment of the present invention shown in FIG. 1, the received signal will undergo the zero-degree hybrid 14a and the 90-degree hybrid 14c of the quadrature detection unit 14, the low-pass filters 15*i* and 15*q*, and the A/D converters 16*i* and 16*q*. In this process, the received signal will suffer from the amplitude error and the phase error caused by inherent characteristics of the devices. However, owing to the signal processing circuit 17, estimation and correction can be performed on the errors in a manner described as follows.

Initially, the phase error detecting unit 1 detects an amplitude error of the I"-signal with respect to the Q"-signal as the amplitude error of the I"-signal and the Q"-signal outputted from the A/D converters 16*i* and 16*q* [see Equation (1)]. Then, the amplitude error correcting unit 2 effects the phase error correction in the I"-signal by using the detected amplitude error and outputs the resultant signal as the I'-signal having undergone the amplitude error correction.

The phase error detecting unit 3 calculates the cross-correlation value [see Equation (22)] of the I'-signal and the Q'-signal (Q"-signal) having undergone the amplitude error correction in the amplitude error correcting unit 2, and thereafter detects the phase error $\Delta$ of the I'-signal and the Q'-signal as the Q'-signal with respect to the I'-signal [see Equation (24)].

The phase error correcting unit 4 effects the phase error correction on the Q'-signal by using the detected phase error, and outputs the Q-signal as the result of amplitude error correction and phase error correction. In other words, the I-component is removed from the Q'-signal. In this way, the signal processing circuit 17 can output the Q-signal having undergone the amplitude error correction and the phase error correction. Also, the signal processing circuit 17 can output the I-signal having undergone the amplitude error correction and the phase error correction through the delay adjusting circuit 5.

As described above, according to the first embodiment of the present invention, owing to the cross-correlation value calculating unit including components 3*a* to 3*f* and the phase error calculating unit 3*g* of the phase error detecting unit 3, even if the components constituting the receiver such as of the quadrature detection unit 14, the low-pass filters 15*i* and 15*q*, the A/D converters 16*i* and 16*q* and so on have inherent device characteristics, respectively, and these device characteristics cause the phase error between the I-component and the Q-component, it becomes possible to carry out accurate estimation on the phase error by additionally providing the signal processing circuit function implemented by a simple arrangement at a stage for carrying out the baseband processing. Therefore, signal deterioration can be eliminated by correcting the phase error, and the S/N ratio and the bit error rate can be improved.

In particular, if signal transmission is requested for a signal necessitating a relatively high S/N ratio such as one using a multi-code in a spread spectrum demodulation or one using a multi-value demodulation, the requested level of S/N ratio can be secured.

Further, when the phase error correction is carried out, the correction can be achieved without providing a feedback control. Therefore, the phase error can be accurately estimated as described above, and the circuit for carrying out the phase error correction comes to have a high response speed.

Furthermore, the amplitude error detecting unit 1 and the amplitude error correcting unit 2 are provided on the upstream side relative to the stage of the phase error detection in the phase error detecting unit 3, and the amplitude error correction is made in advance to the phase error detection. Therefore, the phase error can be detected at a higher accuracy.

While in the above-described first embodiment the signal processing circuit 17 has both of the estimating function and the correcting function for both of the amplitude error and the phase error, the present invention is not limited to this arrangement. That is, the signal processing circuit 17 may have only the estimating function for the amplitude error and the phase error, or only the estimating function for only the phase error. Alternatively, the signal processing circuit 17 may have only the estimating function for the phase error and the correcting function for the phase error.

[b] Explanation of Second Embodiment

Figure 4:
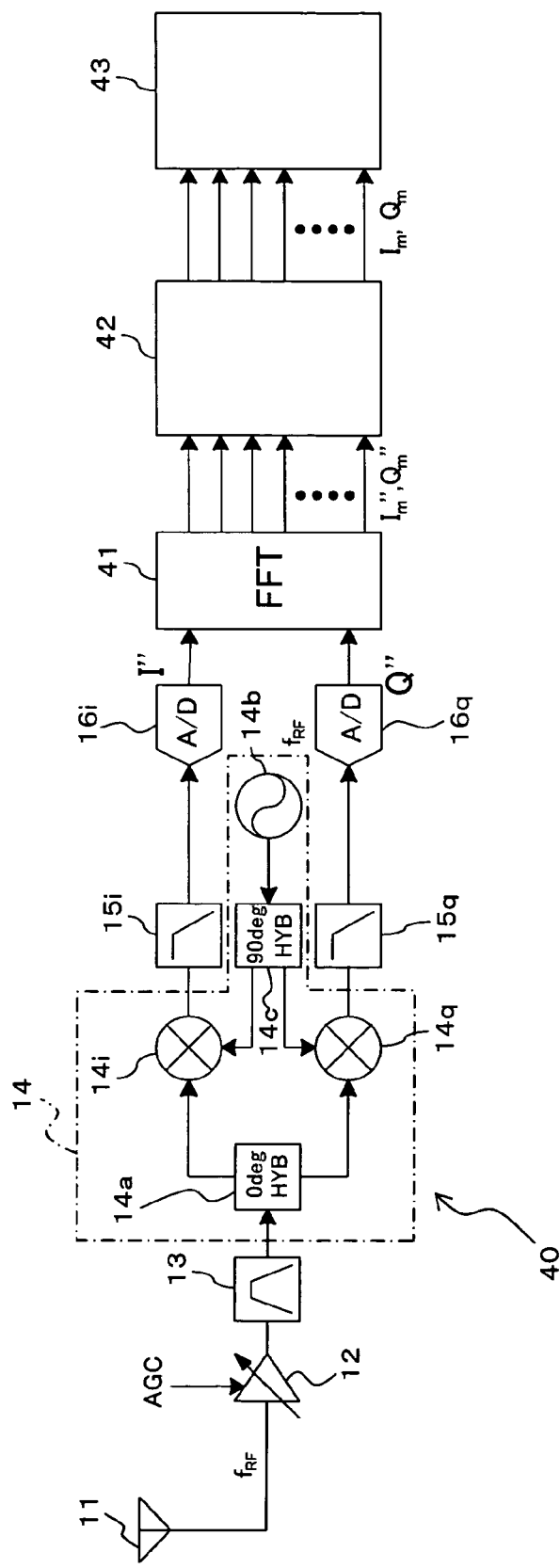
FIG. 4 is a block diagram showing a receiver of a second embodiment of the present invention.

FIG. 4 is a block diagram showing an arrangement of a receiver 40 according to a second embodiment of the present invention. Also in the receiver 40 shown in FIG. 4, a radio wave transmission signal transmitted from a transmitter not shown, for example, is received. The above arrangement is different from that of the aforesaid first embodiment in the following points. That is, the receiver 40 shown in FIG. 4 is arranged to receive an OFDM signal as a signal from an apparatus on the transmission side, and the amplitude error correction, the phase error correction and the demodulation are made on the OFDM received signal.

To this end, the receiver 40 of the second embodiment comprises the antenna, the AGC amplifier 12, the band-pass filter 13, the quadrature detection unit 14, the low-pass filters 15*i* and 15*q*, and the A/D converters 16*i* and 16*q*, which have the similar functions to those of the receiver 10 of the aforesaid first embodiment. The receiver 40 of the second embodiment further comprises a fast Fourier transforming unit 41, a signal processing circuit 42 and a digital demodulation processing unit 43.

The receiver 40 shown in FIG. 4 is arranged to receive the OFDM signal. Therefore, the quadrature detection unit carries out quadrature detection on a signal deriving from quadrature frequency division multiplexing with a reference frequency signal.

The fast Fourier transforming unit 41 is a unit for effecting a fast Fourier transformation on output signals from the A/D converters 16*i* and 16*q* and outputting signals of I-component and Q-component for each subcarrier. The signal processing circuit 42 is a circuit for detecting (estimating) and making correction on the amplitude error and the phase error of the I-component and the Q-component of each carrier signal supplied from the fast Fourier transforming unit 41. The digital demodulation processing unit 43 is a unit for effecting digital demodulation processing on the I-signal and the Q-signal of each subcarrier having undergone the amplitude error and the phase error which are determined as of one of the I-component and the Q-component with respect to the other of the same. Thus, data is demodulated by the digital demodulation unit 43.

Figure 10:
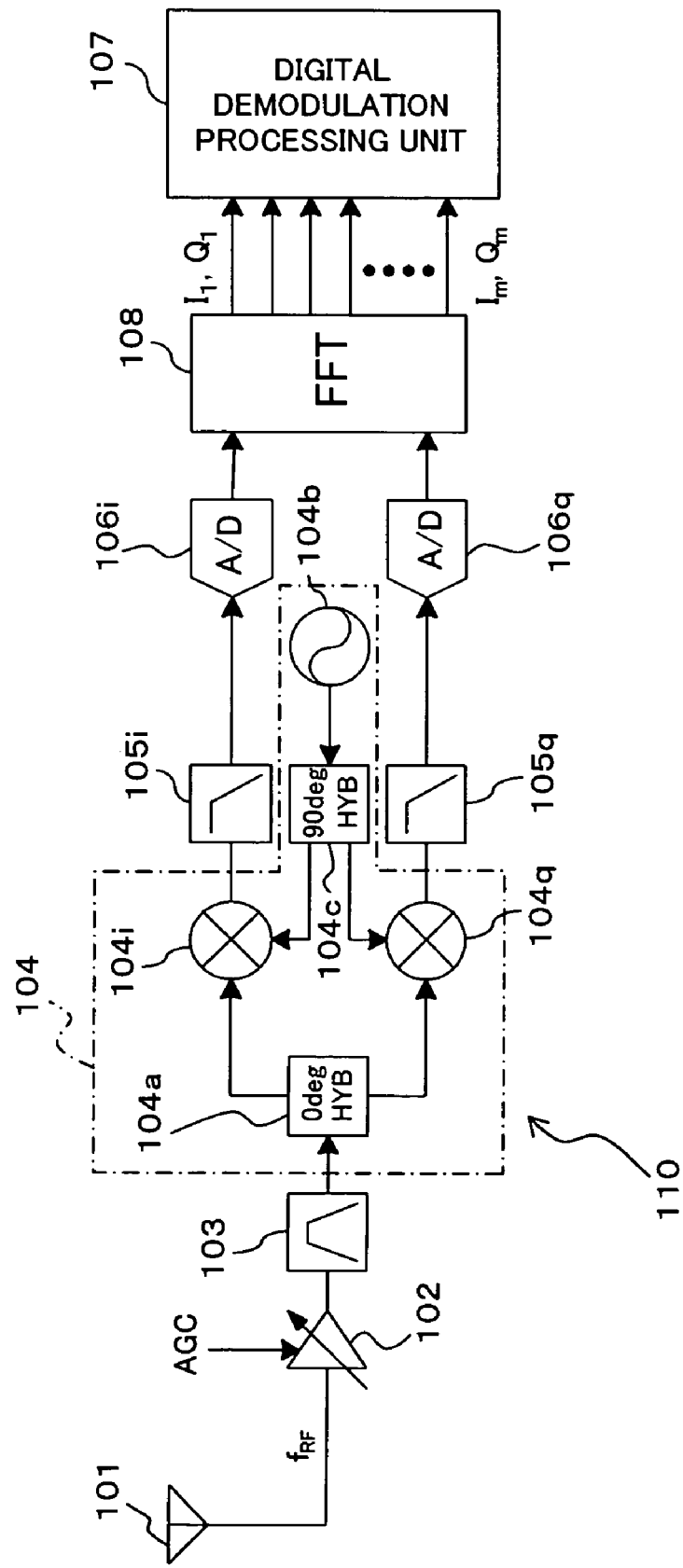
FIG. 10 is a block diagram showing a receiver employing the OFDM technology.

The fast Fourier transforming unit 41 and the digital demodulation processing unit 43 are units having the similar functions to those of the components (see reference numerals 108 and 107), respectively, which are described with reference to FIG. 10. The signal processing circuit 42 has a characteristic feature of the present invention. The above-described function section, i.e., a series of components from the quadrature detection unit 14 to the signal processing circuit 42, or the stage soon before the digital demodulation processing unit 43 (see reference numerals 14, 15*i* 15*q*, 16*i*, 16*q*, 41 and 42) may be arranged as a quadrature demodulation apparatus.

The fast Fourier transforming unit 41 functions as a subcarrier quadrature detection component outputting unit for outputting a couple of quadrature detection components (I1", Q1", I2", Q2", ..., Im", Qm") from the couple of signals having undergone the quadrature detection in the quadrature detection unit 14 for each subcarriers which are subjected to the quadrature frequency division demultiplexing. In this case, m represents the number of subcarriers.

Figure 5:
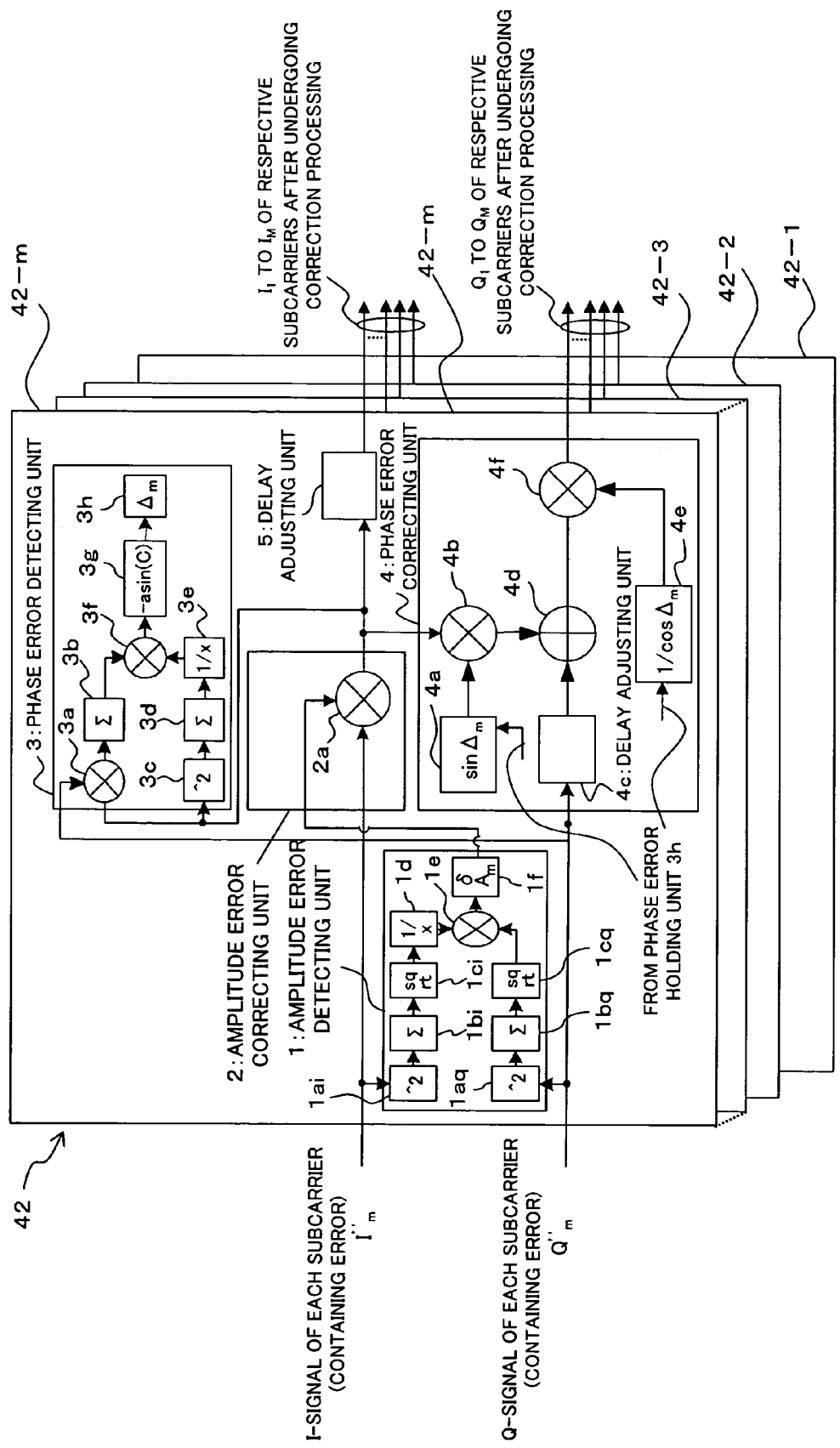
FIG. 5 is a block diagram showing a signal processing circuit of the second embodiment of the present invention.

As shown in FIG. 5, the signal processing circuit 42 is composed of a set of signal processing circuit modules 42-1 to 42-m each of which is supplied with the quadrature detection components of the aforesaid corresponding subcarrier and corrects the amplitude error and the phase error determined as of one of the I-component and the Q-component with respect to the other of the same. In other words, each of the signal processing circuit modules 42-j (j; 1 to m) corrects the amplitude error and the phase error of the Ij"-signal and Qj"-signal, and the signal having undergone the amplitude error correction and the phase error correction [I-signal (I1-signal to Im-signal) and the Q-signal (Q1-signal to Qm-signal)] are outputted therefrom.

As shown in FIG. 5, each of the signal processing circuit modules 42-j has the same arrangement as that of the signal processing circuit 17 of the aforesaid first embodiment. That is, each signal processing circuit module 42-j is arranged to include the amplitude error detecting unit 1, the amplitude error correcting unit 2, the phase error detecting unit 3, the phase error correcting unit 4 and the delay adjusting unit 5.

With the above arrangement of the receiver 40 as the second embodiment of the present invention, owing to the signal processing circuit modules 42-1 to 42-m, the OFDM signals can be subjected to the detection and the correction on the amplitude error and the phase error for each subcarrier.

Initially, as expressed in the following Equation (25), the amplitude error detecting unit 1 of the signal processing circuit module 42-j receives, for a predetermined period of time, information indicative of amplitudes of the I-component and Q-component (Ij"-signal and Qj"-signal) of m-subcarriers after undergoing the fast Fourier transformation processing in the fast Fourier transforming unit 41, and takes an average of the received data. Then, a ratio of the averaged Ij"-signal values to the averaged Qj"-signal values to detect (estimate) the amplitude error δ Aj of the I-component and Q-component of each subcarrier.

$$\delta A_j = \frac{\text{averaged value of } Q_j'' - \text{amplitudes}}{\text{averaged value of } I_j'' - \text{amplitudes}} = \frac{\sqrt{\frac{\sum_{n=0}^{N}(Q_{jn}')^2}{N}}}{\sqrt{\frac{\sum_{n=0}^{N}(I_{jn}'')^2}{N}}} = \frac{\sqrt{\sum_{n=0}^{N}(Q_{jn}')^2}}{\sqrt{\sum_{n=0}^{N}(I_{jn}'')^2}} \quad (25)$$

Subsequently, the multiplying unit 2a constituting the amplitude error correcting unit 2 of the signal processing circuit module 42-j carries out a multiplying calculation by using the amplitude error δ Aj detected by the amplitude error detecting unit as expressed in the following Equation (26). Thus, the I-component phase error is corrected and the resultant signal is outputted as Ij'-signal therefrom. The Q-component is utilized as a reference of the amplitude error of the I-component which is determined as one with respect to the Q-component. Therefore, as expressed in the following Equation (27), the phase error detecting unit 3 in the subsequent stage directly utilizes the Qj"-signal as the Qj'-signal as one having undergone the amplitude error correction.

$$I_j' = I_j'' \times \delta A_j \quad (26)$$

$$Q_j' = Q_j'' \quad (27)$$

Further, a function section composed of the components 3a to 3f in the phase error detecting unit 3 of the signal processing circuit 42-j carries out calculation as expressed in the following Equation (28) to determine a normalized cross-correlation value Cj of the Ij'-signal and the Qj'-signal as the I-component signal and the Q-component signal which have undergone the amplitude error correction as described above.

$$C_j = \frac{\sum_{k=0}^{n}(I_{jk}' \times Q_{jk}')}{\sum_{k=0}^{n}(I_{jk}')^2} \quad (28)$$

The function unit 3g of the phase error detecting unit 3 carries out calculation as expressed in the following Equation (29) to detect (estimate) the phase error Δ j [degree] based on the (normalized) cross-correlation value Cj calculated as described above.

$$\Delta_j = a \sin(-C_j) \quad (29)$$

The phase error correcting unit 4 of the signal processing circuit module 42-j effects the phase error correction on the Qj'-signal having undergone the amplitude error correction as expressed in the following Equation (30) and outputs the resultant signal as one having undergone the phase error correction (Qj-signal).

$$(Q_j' + I_j' \sin \Delta_j)/\cos \Delta_j \rightarrow Q_j \quad (30)$$

In this way, as the I-signal and the Q-signal having undergone the amplitude error correction and the phase error correction from the signal processing circuit module 42-j, the Qj-signal having undergone the phase error correction in the phase error correcting unit 4 and the Ij-signal from the delay adjusting unit 5 can be outputted.

As described above, according to the second embodiment of the present invention, advantages similar to those of the aforesaid first embodiment can be provided. Further, since the phase error detecting unit 3 is provided in each of the signal processing circuit modules 42-1 to 42-m, the phase error detection on the OFDM signal in particular can be carried out for each of the subcarriers independently. That is, as for the OFDM signal, it is assumed that the phase error between the I-component and the Q-component can be caused in a different manner depending on each subcarrier by the characteristics inherent to the components constituting the receiver such as the quadrature detection unit 14, the low-pass filters 15i and 15q, the A/D converters 16i and 16q and so on. However, if some simple signal processing circuit function is added to the stage for carrying out the baseband processing, then the phase error caused in a different manner depending on each subcarrier can be estimated accurately and at a high speed. Accordingly, the S/N ratio and the bit error rate characteristic can be remarkably improved.

While in the above second embodiment each of the signal processing circuit modules 42-1 to 42-m has a function for estimating and correcting the amplitude error and the phase error, the present invention is not limited to this arrangement. That is, the signal processing circuit 17 may be arranged to have a function of only estimating at least the amplitude error and the phase error. Alternatively, the signal processing circuit 17 may be arranged to have a function of only estimating the phase error. Alternatively, the signal processing circuit 17 may be arranged to have only functions of estimating the phase error and correcting the phase error.

[c] Explanation of Third Embodiment

Figure 6:
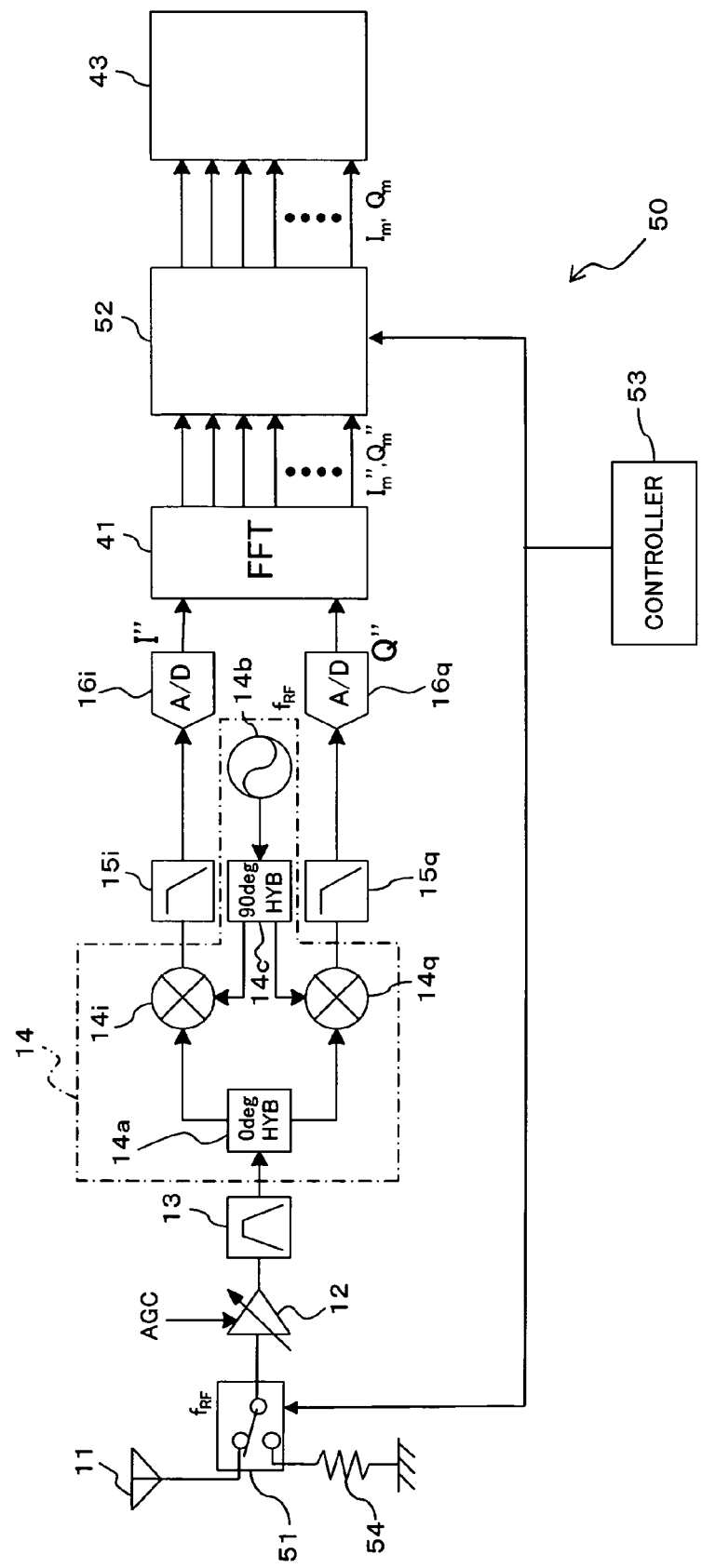
FIG. 6 is a block diagram showing a receiver of a third embodiment of the present invention.

FIG. 6 is a block diagram showing a receiver 50 according to a third embodiment of the present invention. The arrangement of the receiver 50 shown in FIG. 6 is the same as the aforesaid second embodiment in that the amplitude error correction and the phase error correction are effected on the OFDM received signal and demodulation is also effected on the OFDM received signal. However, the arrangement of the receiver 50 shown in FIG. 6 is different from that of the aforesaid second embodiment in that the arrangement thereof is additionally provided with a switching mechanism which makes it possible to carry out operation mode switching action between a test mode and a practical mode.

To this end, the receiver 50 of the third embodiment comprises a changeover switch 51 between the antenna 11 and the AGC amplifier 12, a signal processing circuit 52 different from that of the second embodiment, and a controller 53 for controlling the switching operation of the above-described changeover switch 51 and the operation mode of the signal processing circuit 52. The rest of the arrangement of the third embodiment (see reference numerals 12 to 14, 15$i$, 15$q$, 16$i$, 16$q$, 41 and 43) is substantially the same as that of the aforesaid second embodiment.

The changeover switch 51 responds to the switching control of the controller 53 so as to select one of connection statuses, i.e., connection allowing a signal (signal upon the practical mode) from the antenna 11 to be led into the receiver 50 and connection allowing a signal (test signal) from a random noise source such as a terminating resister 54. The selected signal is supplied to the AGC amplifier 12.

The quadrature detection unit 14 is a unit for effecting quadrature detection with a reference frequency signal on a signal which is selected by the changeover switch 51 and supplied thereto through the AGC amplifier 12 and the band-pass filter 13.

Figure 7:
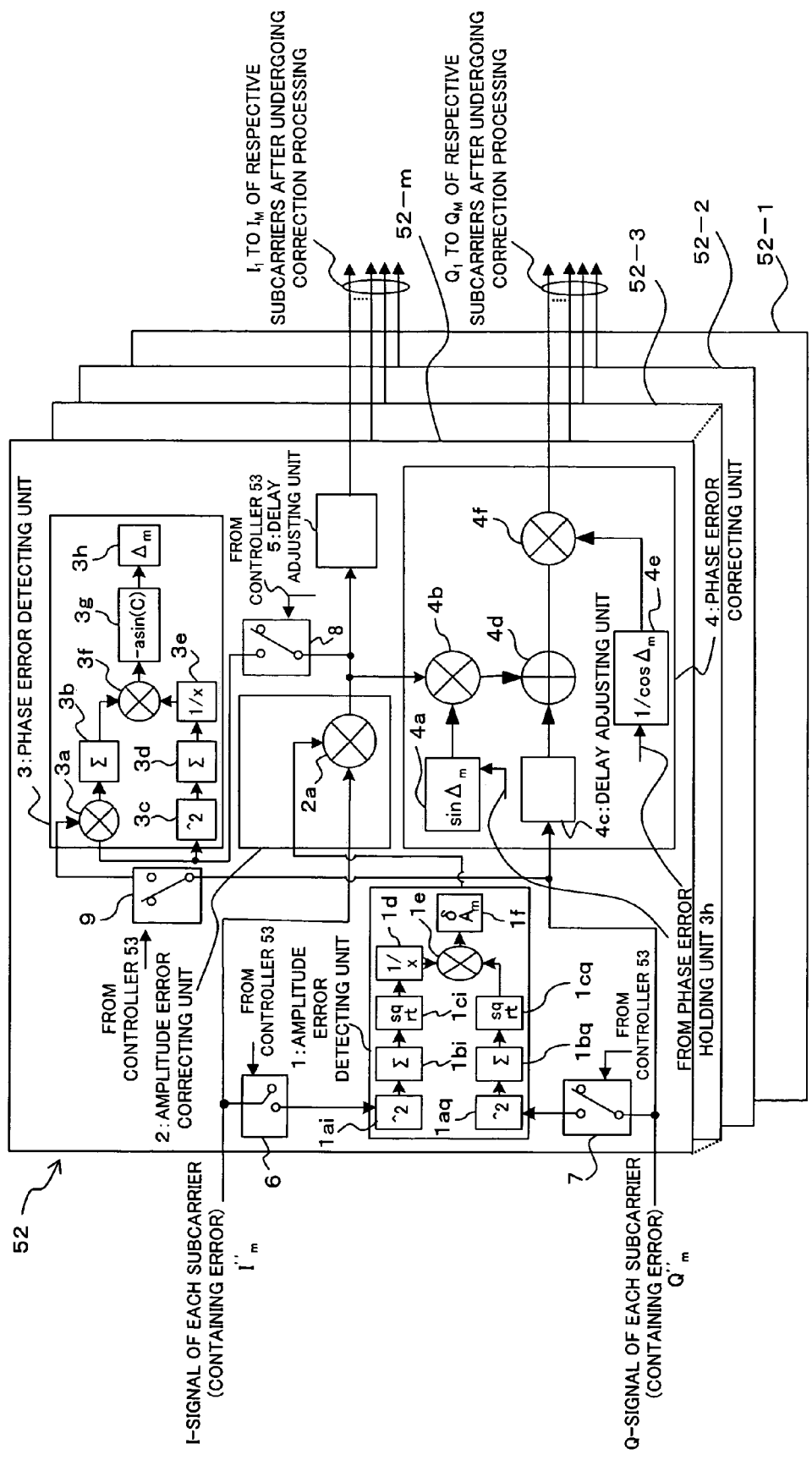
FIG. 7 is a block diagram showing a signal processing circuit of the third embodiment of the present invention.

As shown in FIG. 7, the signal processing circuit 52 is composed of a plural number of signal processing circuit modules 52-1 to 52-$m$ ($m$ is the number of subcarriers) each of which can carry out detection and correction on the amplitude error and the phase error of the I-component and Q-component of the corresponding subcarrier supplied from the fast Fourier transforming unit 41.

Similarly to the case of the aforesaid second embodiment, each signal processing circuit module 52-1 to 52-$m$ comprises the amplitude error detecting unit 1, the amplitude error correcting unit 2, the phase error detecting unit 3 and the phase error correcting unit 4. The signal processing circuit module 52-1 to 52-$m$ additionally comprises switches 6 to 9 so that switching action is carried out between an operation mode for detecting the amplitude error and the phase error and another operation mode not for detecting the amplitude error and the phase error for each supplied subcarrier.

The controller 53 controls the switching action of the changeover switches 6 to 9 so that the amplitude error detecting unit 1 and the phase error detecting unit 3 of each signal processing circuit module 52-1 to 52-$m$ can be controlled in their operation mode.

In more detail, when the controller 53 makes the changeover switches 6 to 9 establish the on-status connection, then the operation mode is taken place. That is, the amplitude error detecting unit 1 and the phase error detecting unit 3 detect the amplitude error and the phase error contained in each subcarrier supplied to the amplitude error detecting unit 1 and the phase error detecting unit 3. Then, the amplitude error correcting unit 2 and the phase error correcting unit 4 correct the detected amplitude error and phase error.

Conversely, when the controller 53 makes the changeover switches 6 to 9 establish the off-status connection, then another operation mode is taken place. That is, the amplitude error detecting unit 1 and the phase error detecting unit 3 do not detect the amplitude error and the phase error contained in each subcarrier supplied to the amplitude error detecting unit 1 and the phase error detecting unit 3. Then, amplitude error held in an amplitude error holding unit 1$f$ is utilized to carry out amplitude error correction in the amplitude error correcting unit 2 while phase error held in a phase error holding unit 3$h$ is utilized to carry out phase error correction in the phase error correcting unit 4. FIG. 7 illustrates a state of the signal processing circuit module 52-$m$ in which the changeover switches 6 to 9 are brought into the off-connection status.

In more detail, the controller 53 can control the switching action of the changeover switch 6 between the connected (on-) status and the disconnected (off-) status so that the I-component (I"-signal) supplied from the fast Fourier transforming unit 41 can be selectively led to the amplitude error detecting unit 1. Also, the controller 53 can control the switching action of the changeover switch 7 between the connected (on-) status and the disconnected (off-) status so that the Q-component (Q"-signal) supplied from the fast Fourier transforming unit 41 can be selectively led to the amplitude error detecting unit 1.

Further, the controller 53 can control the switching action of the changeover switch 8 between the connected (on-) status and the disconnected (off-) status so that the I-component (I'-signal) having undergone the amplitude error correction can be selectively led to the phase error detecting unit 3. Also, the controller 53 can control the switching action of the changeover switch 9 between the connected (on-) status and the disconnected (off-) status so that the Q-component (Q'-signal) having undergone the amplitude error correction can be selectively led to the phase error detecting unit 3.

Furthermore, when the test mode is selected, the controller 53 controls the changeover switch 51 to establish connection to the terminating resistor 54. Also, the controller 53 controls the changeover switches 6 to 9 to establish the connected status so that the amplitude error detecting unit 1 and the phase error detecting unit 3 are placed into on-status in their operation mode. Thus, the random noise led from the terminating resistor 54 is utilized for detecting the amplitude error and the phase error.

The amplitude error detected upon the above-described test mode is held in the amplitude error holding unit 1$f$ while the phase error detected upon the test mode is held in the phase error holding unit 3$h$. In other words, the amplitude error holding unit 1$f$ and the phase error holding unit 3$h$ function as a memory unit for memorizing the amplitude error and the phase error detected by the amplitude error detecting unit 1 and the phase error detecting unit 3.

Further, when the practical mode is selected, the controller 53 makes the changeover switch 51 establish connection to the antenna 11 and brings the changeover switches 6 to 9 into the disconnected status so that the amplitude error detecting unit 1 and the phase error detecting unit 3 are brought into the off status in their operation mode. In this way, as will be described later on, the processing in each signal processing circuit module 52-1 to 52-*m* is simplified in the following manner. That is, the amplitude error and the phase error are detected in advance in the test mode and the detected amplitude error and phase error are held in the amplitude error holding unit 1*f* and the phase error holding unit 3*h,* respectively. Then, the amplitude error and the phase error held in the amplitude error holding unit 1*f* and the phase error holding unit 3*h* are utilized for the amplitude error correction in the amplitude error correcting unit 2 and the phase error correction in the phase error correcting unit 4.

Accordingly, the above-described controller 53 can function as a controlling unit for controlling the changeover switch 51 so that the test signal is supplied to the receiver 50 upon the test mode while the practical signal is supplied to the receiver 50 upon the practical mode. The controller 53 can also function as a controlling unit for controlling the amplitude error detecting unit 1 and the phase error detecting unit 3 so that when the test mode is selected the amplitude error and the phase error detected by the amplitude error detecting unit 1 and the phase error detecting unit 3 are stored in the amplitude error holding unit 1*f* and the phase error holding unit 3*h,* respectively. Furthermore, the controller 53 can function as a controlling unit for controlling the amplitude error correcting unit 2 and the phase error correcting unit 4 so that when the practical mode is selected the amplitude error correcting unit 2 and the phase error correcting unit 4 effect the amplitude error correction and the phase error correction on the couple of signals driving from the quadrature demodulation in the quadrature detection unit 14 based on the contents stored in the amplitude error holding unit 1*f* and the phase error holding unit 3*h,* respectively.

The amplitude error and the phase error are caused by device characteristics inherent to respective components of the receiver 50, i.e., the quadrature detection unit 14, the low-pass filters 15*i,* 15*q,* and the A/D converters 16*i,* 16*q.* Therefore, the amplitude error and the phase error are not dependent of the quality of signal supplied to the receiver 50. That is, when the test mode is selected, it is unnecessary to intentionally utilize the signal transmitted from the transmission side for measuring the amplitude error and the phase error, but the random noise supplied from the terminating resistor 54, for example, can be utilized for detecting the amplitude error and the phase error.

In other words, the amplitude error and the phase error detected by using the random noise, i.e., the amplitude error and the phase error determined in the test mode, can be utilized for correcting accurately the amplitude error and the phase error contained in the received signal (i.e., the practical signal) which is received by the antenna 11 and still not subjected to the demodulation processing in the digital demodulation processing unit 43.

According to the receiver 50 of the third embodiment of the present invention, with the above arrangement of the signal processing circuit module 52-1 to 52-*m,* detection and correction can be carried out for each subcarrier on the amplitude error and the phase error contained in the OFDM signal in the following manner.

That is, when the test mode is selected, the controller 53 controls the changeover switch 51 to establish connection to the terminating resistor 54 and the changeover switches 6 to 9 of each signal processing circuit module 52-1 to 52-*m* to take place the on-operation mode in the amplitude error detecting unit 1 and the phase error detecting unit 3.

At this time, the quadrature detection unit 14 outputs a couple of quadrature detection components deriving from the quadrature demodulation effected on the random noise serving as the test signal and supplied from the terminating resistor 54 (step of outputting the quadrature detection components). In this case, since the changeover switch 51 does not take the connection status to the antenna 11, the quadrature detection unit 14 does not carry out the quadrature demodulation on the signal received by the antenna 11 (i.e., a signal actually transmitted from the transmission side). Thus, the quadrature detection unit 14 carries out the quadrature demodulation on the random noise signal generated from the terminating resistor 54.

Subsequently, the amplitude error detecting unit 1 of each signal processing circuit module 52-1 to 52-*m* detects the amplitude displacement of one of the couple of components with respect to the other of the same (e.g., an amplitude displacement of the I-component with respect to the Q-component) as the amplitude error of the quadrature detection component outputted in the step of outputting the quadrature detection components (step of detecting the amplitude error). The detected amplitude error is stored in the amplitude error holding unit 1*f* (step of memorizing the amplitude error).

Thereafter, the phase error detecting unit 3 of each signal processing circuit module 52-1 to 52-*m* detects the phase displacement of one of the couple of components with respect to the other of the same (e.g., a phase displacement of the Q-component with respect to the I-component) as the phase error of the quadrature detection component outputted in the step of outputting the quadrature detection components (step of detecting the phase error). The detected phase error is stored in the phase error holding unit 3*h* (step of memorizing the phase error).

As described above, by using the amplitude error and the phase error estimated when the test mode is selected, the amplitude error correction and the phase error correction are carried out on the signal at the stage prior to the digital demodulation processing in the digital demodulation processing unit 43 when the practical mode is selected.

That is, when the practical mode is selected, the amplitude error correcting unit 2 and the phase error correcting unit 4 of each signal processing circuit module 52-1 to 52-*m* carries out the error correction as follows. That is, the amplitude error correcting unit 2 corrects the amplitude error contained in the couple of quadrature detection components upon the practical mode based on the amplitude error (the value held in the amplitude error holding unit 1*f*) estimated as described above (step of correcting the amplitude error). The phase error correcting unit 4 corrects the phase error contained in the couple of quadrature detection components upon the practical mode based on the phase error (the value held in the phase error holding unit 3*h*) estimated as described above (step of correcting the phase error).

As described above, according to the third embodiment of the present invention, in addition to the advantages similar to those of the aforesaid second embodiment, the following advantages can be obtained. That is, the arrangement of the third embodiment comprises the changeover switch 51, the changeover switches 6 to 9 in each signal processing circuit module 52-1 to 52-*m,* and the controller 53 for controlling the switching action of the changeover switch 51 and 6 to 9. Therefore, when the mode selection is done to take place the practical mode in which the receiving processing is effected on the signal transmitted through the actual radio wave transmission channel, this receiving processing can be carried out in a simple manner by the signal processing circuit module 52-1 to 52-*m*, with the result that processing load imposed on the overall arrangement of the apparatus can be decreased.

While in the above-described third embodiment each of the signal processing circuit modules 52-1 to 52-*m* comprises the changeover switches 6 to 9 for controlling the switching action between the test mode and the practical mode, the present invention may be arranged to switch the operation mode by other scheme. At this time, at least when the test mode is selected, the phase error correcting unit 4 may be brought into an inactive mode.

[d] Other Disclosure

The present invention is not limited to the above-described embodiments but various changes and modifications maybe effected without departing from the gist of the present invention.

For example, as a system of detection employed in the quadrature demodulation processing, any detection system can be employed such as a synchronous detecting system, semi-synchronous detecting system and so on.

Further, the apparatus of the present invention can be produced based on the above-described embodiments.

What is claimed is:

1. A signal processing circuit comprising:
   a cross-correlation value calculating unit for calculating a cross-correlation value of a pair of signals having undergone a quadrature detection; and
   a phase error calculating unit for calculating a phase displacement of one of said pair of signals with respect to the other of the same as a phase error based on said cross-correlation value calculated by said cross-correlation value calculating unit.

2. A signal processing circuit according to claim 1, further comprising a phase error correcting unit for correcting phase error detected by said phase error detecting unit.

3. A signal processing circuit comprising:
   an amplitude error detecting unit for detecting an amplitude displacement of one of a first pair of signals with respect to the other of the same as an amplitude error of said first pair of signals having undergone a quadrature detection;
   an amplitude error correcting unit for correcting said amplitude error detected by said amplitude error detecting unit; and
   a phase error detecting unit for detecting a phase displacement of one of a second pair of signals with respect to the other of the same as a phase error of said second pair of signals, said second pair of signals having undergone said amplitude error correction processing in said amplitude error correcting unit.

4. A signal processing circuit according to claim 3, wherein said phase error detecting unit comprising:
   a cross-correlation value calculating unit for calculating a cross-correlation value of said second pair of signals having undergone said amplitude error correction; and
   a phase error calculating unit for calculating a phase displacement of one of said second pair of signals having undergone said amplitude error correction with respect to the other of the same as a phase error based on said cross-correlation value calculated by said cross-correlation value calculating unit.

5. A signal processing circuit according to claim 3, further comprising a phase error correcting unit for correcting phase error detected by said phase error detecting unit.

6. A signal processing circuit according to claim 4, wherein said cross-correlation value calculating unit comprising:
   a standard value calculating unit for determining a standard value by carrying out summation calculation on first discrete values supplied thereto for a predetermined period of time, each of said first discrete values being created by squaring a value of one of said second pair of signals having undergone said amplitude error correction;
   a reference value calculating unit for determining a reference value by carrying out summation calculation on second discrete values generated therefrom for a predetermined period of time, each of said second discrete values being created by calculating product of said pair of signals having undergone said amplitude error correction; and
   a ratio calculating unit for calculating a ratio value of said standard value relative to said reference value as said cross-correlation value based on the results of calculation deriving from said standard value calculating unit and said reference value calculating unit.

7. A signal processing circuit according to claim 6, wherein said phase error calculating unit is composed of an arcsine function calculating unit for calculating an arcsine function corresponding to said ratio value calculated by said ratio calculating unit of said cross-correlation value calculating unit and outputting the result of the calculation as said phase error.

8. A signal processing circuit according to claim 7, further comprising a phase error correcting unit for correcting said phase error calculated by said phase error calculating unit, wherein said phase error correcting unit comprising:
   a first calculating unit for multiplying one of said second pair of signals having undergone the amplitude error correction with a sine value corresponding to an arcsine function value determined by said arcsine function calculating unit;
   a second calculating unit for adding the result of calculation deriving from said first calculating unit and a signal value of one of said second pair of signals having undergone said amplitude error correction together; and
   a third calculating unit for dividing the result of calculation deriving from said second calculating unit with a cosine value corresponding to an arcsine function value determined by said arcsine function calculating unit, and outputting the result of division as a result of said amplitude error correction and said phase error correction.

9. A quadrature demodulation apparatus comprising:
   a quadrature detection unit for effecting quadrature detection on a signal having undergone a quadrature frequency division multiplexing with a standard frequency signal;
   a subcarrier quadrature detection component outputting unit for outputting a couple of quadrature detection components for each of subcarriers deriving from the quadrature frequency division demultiplex of a pair of signals which have been undergone quadrature detection in said quadrature detection unit; and
   a signal processing circuit provided for each subcarrier supplying channel supplying a subcarrier from said subcarrier quadrature detection component outputting unit, each of said signal processing circuit having a phase error detecting unit for detecting a phase displacement of one of said couple of quadrature detection components with respect to the other of the same as a phase error, respectively.

10. A quadrature demodulation apparatus according to claim 9, wherein said signal processing circuit provided for each subcarrier supplying channel, respectively comprising:
an amplitude error detecting unit for detecting an amplitude displacement of one of said couple of quadrature detection components with respect to the other of the same as an amplitude error of said couple of quadrature detection components of said corresponding subcarrier; and
an amplitude error correcting unit for correcting said amplitude error detected by said amplitude error detecting unit, wherein
said phase error detecting unit detects a phase displacement of one of said couple of quadrature detection components with respect to the other of the same as a phase error of said couple of quadrature detection components having undergone said amplitude correction in said amplitude error correcting unit.

11. A quadrature demodulation apparatus according to claim 9, wherein said phase error detecting unit of a signal processing circuit provided for each subcarrier supplying channel comprising:
a cross-correlation value calculating unit for calculating a cross-correlation value of corresponding couple of quadrature detection components supplied from said subcarrier quadrature detection component outputting unit; and
a phase error calculating unit for calculating phase error based on said cross-correlation value calculated by said cross-correlation value calculating unit.

12. A quadrature demodulation apparatus according to claim 9, further comprising a phase error correcting unit for correcting phase error detected by said phase error detecting unit.

13. A quadrature demodulation apparatus according to claim 11, wherein said cross-correlation value calculating unit of a signal processing circuit provided for each subcarrier supplying channel comprising:
a standard value calculating unit for determining a standard value by carrying out summation calculation on first discrete values supplied thereto for a predetermined period of time, each of said first discrete values being created by squaring a value of one of said corresponding couple of quadrature demodulating components;
a reference value calculating unit for determining a reference value by carrying out summation calculation on second discrete values supplied thereto for a predetermined period of time, each of said second discrete values being created by calculating product of said corresponding couple of quadrature detecting components; and
a ratio calculating unit for calculating a ratio value of said standard value relative to said reference value as said cross-correlation value based on the results of calculation deriving from said standard value calculating unit and said reference value calculating unit.

14. A quadrature demodulation apparatus according to claim 13, wherein said phase error calculating unit of a signal processing circuit provided for each subcarrier supplying channel comprises an arcsine function calculating unit for calculating an arcsine function corresponding to said ratio value determined by said ratio calculating unit of said cross-correlation value calculating unit and outputting the result of the calculation as said phase error.

15. A quadrature demodulation apparatus according to claim 14 including a signal processing circuit provided for each subcarrier supplying channel having a phase error correcting unit for correcting said phase error calculated by said phase error calculating unit, said phase error correcting unit comprising:
a first calculating unit for multiplying one of said pair of signals having undergone the amplitude error correction with a sine value corresponding to an arcsine function value determined by said ratio calculating unit;
a second calculating unit for adding the result of calculation deriving from said first calculating unit and a signal value of one of said pair of signals having undergone said amplitude error correction together; and
a third calculating unit for dividing the result of calculation deriving from said second calculating unit by a cosine value corresponding to the arcsine function value determined by said ratio calculating unit, and outputting the result of division as a result of said amplitude error correction and said phase error correction.

16. A quadrature demodulation apparatus comprising:
a changeover switch for selectively establishing one of a test mode connection and a practical mode connection so that one of a test mode signal and a practical mode signal is selectively outputted therefrom;
a quadrature detection unit for effecting quadrature detection on a signal supplied from said changeover switch with a standard frequency signal;
an amplitude error detecting unit for detecting an amplitude displacement of one of a pair of signals with respect to the other of the same as an amplitude error of said pair of signals which have been undergone the quadrature demodulation in said quadrature demodulation unit;
a phase error detecting unit for detecting a phase displacement of one of the pair of signals with respect to the other of the same as a phase error of said pair of signals which have been undergone the quadrature demodulation in said quadrature demodulation unit;
a memory unit for memorizing said amplitude error and said phase error detected by said amplitude error detecting unit and said phase error detecting unit;
an amplitude error correcting unit for correcting the amplitude error of said pair of signals which have been undergone the quadrature demodulation in said quadrature demodulation unit based on the amplitude error memorized in said memory unit;
a phase error correcting unit for correcting the phase error of said pair of signals which have been undergone the quadrature demodulation in said quadrature demodulation unit based on the phase error memorized in said memory unit; and
a control unit for controlling said changeover switch so that said changeover switch selects one of the test mode connection and the practical mode connection depending on the desired mode, wherein
when the test mode is selected, said control unit controls said amplitude error detecting unit and said phase error detecting unit so that the amplitude error and the phase error detected by said amplitude error detecting unit and said phase error detecting unit are memorized in said memory unit, and when the practical mode is selected, said control unit controls said amplitude error correcting unit and said phase error correcting unit so that correction is made in accordance with the contents memorized in said memory unit, on the amplitude error and the phase error of said pair of signals which have been undergone the quadrature demodulation in said quadrature demodulation unit.

17. A method of estimating error for use with a quadrature demodulation apparatus having a quadrature demodulation unit and a signal processing circuit, said quadrature demodulation unit being for effecting quadrature demodulation on a signal having undergone a quadrature frequency division multiplexing with a standard frequency signal, and said signal processing circuit being for carrying out signal processing on a couple of quadrature detection components having undergone the quadrature detection in said quadrature demodulation unit, said method of estimating error comprising a group of steps for a test mode, said group of steps for the test mode comprising steps of:

outputting the couple of quadrature detection components deriving from subjecting a test signal to the quadrature demodulation in said quadrature demodulation unit;

detecting an amplitude displacement of one of said couple of components with respect to the other of the same as amplitude error of said quadrature detection components generated in said step of outputting the quadrature detection components;

memorizing said amplitude error detected in said step of detecting said amplitude error;

detecting a phase displacement of one of said couple of components with respect to the other of the same as phase error of said couple of quadrature detection components generated in said step of outputting the quadrature detection components; and memorizing said phase error detected in said step of detecting said phase error.

18. A method of correcting error for use with a quadrature demodulation apparatus having a quadrature demodulation unit and a signal processing circuit, said quadrature demodulation unit being for effecting quadrature demodulation on a signal having undergone a quadrature frequency division multiplexing with a standard frequency signal and said signal processing circuit being for carrying out signal processing on a couple of quadrature detection components having undergone the quadrature detection in said quadrature demodulation unit, said method of correcting error comprising a group of steps for a test mode and a group of steps for a practical mode, said group of steps for the test mode comprising steps of:

outputting the couple of quadrature detection components deriving from subjecting a test signal to the quadrature demodulation in said quadrature demodulation unit;

detecting an amplitude displacement of one of said couple of components with respect to the other of the same as amplitude error of said quadrature detection components generated in said step of outputting the quadrature detection components;

memorizing said amplitude error detected in said step of detecting said amplitude error;

detecting a phase displacement of one of said couple of components with respect to the other of the same as phase error of said couple of quadrature detection components generated in said step of outputting the quadrature detection components; and memorizing said phase error detected in said step of detecting said phase error, and said group of steps for the practical mode comprising steps of:

correcting said amplitude error of said couple of quadrature detection components upon said practical mode based on said amplitude error memorized in said step of memorizing said amplitude error; and correcting said phase error of said couple of quadrature detection components upon said practical mode based on said phase error memorized in said step of memorizing said phase error.

* * * * *